US012694461B2

(12) United States Patent
Carreon

(10) Patent No.: US 12,694,461 B2
(45) Date of Patent: Jul. 28, 2026

(54) METHODS AND SYSTEMS FOR PROVIDING REAL-TIME ONLINE LANGUAGE SERVICES

(71) Applicant: Gabriel Carreon, Huntington Beach, CA (US)

(72) Inventor: Gabriel Carreon, Huntington Beach, CA (US)

( * ) Notice: Subject to any disclaimer, the term of this patent is extended or adjusted under 35 U.S.C. 154(b) by 287 days.

(21) Appl. No.: 18/339,011

(22) Filed: Jun. 21, 2023

(65) Prior Publication Data

US 2024/0029184 A1     Jan. 25, 2024

Related U.S. Application Data

(60) Provisional application No. 63/368,938, filed on Jul. 20, 2022.

(51) Int. Cl.
*G06Q 50/20* (2012.01)
*G06Q 30/0201* (2023.01)
*G06Q 30/0282* (2023.01)

(52) U.S. Cl.
CPC ....... *G06Q 50/205* (2013.01); *G06Q 30/0206* (2013.01); *G06Q 30/0282* (2013.01)

(58) Field of Classification Search
CPC ............. G06Q 50/205; G06Q 30/0206; G06Q 30/0282
USPC ........................................................ 705/326
See application file for complete search history.

(56) References Cited

U.S. PATENT DOCUMENTS

| | | | |
|---|---|---|---|
| 2015/0193850 A1* | 7/2015 | Tamir ...................... | G06F 40/40 |
| | | | 705/26.61 |
| 2015/0339790 A1* | 11/2015 | Robinson ................ | G06F 40/40 |
| | | | 704/2 |
| 2016/0036740 A1* | 2/2016 | Barber .................... | G06F 21/00 |
| | | | 704/3 |
| 2018/0013893 A1* | 1/2018 | Cohen .................... | G06Q 10/02 |
| 2019/0171716 A1* | 6/2019 | Weber ...................... | H04N 7/15 |
| 2022/0093093 A1* | 3/2022 | Krishnan ................ | G10L 15/24 |
| 2022/0350851 A1* | 11/2022 | Kalekar ................ | G06F 16/337 |
| 2023/0077037 A1* | 3/2023 | Zimmerman ........... | G10L 15/01 |

OTHER PUBLICATIONS

LanguageLine, "Why LanguageLine's Interpretation and Translation Services?" May 12, 2023, retrieved from https://web.archive.org/web/20230512155232/https://www.languageline.com/company/interpretation-and-translation-services (Year: 2023).*

* cited by examiner

*Primary Examiner* — Asfand M Sheikh
*Assistant Examiner* — Joshua D Schneider
(74) *Attorney, Agent, or Firm* — Perkins Coie LLP

(57) ABSTRACT

Described herein are methods, apparatus, and systems to facilitate the requesting and the providing of real-time interpretation and translation services, to enable a language service requester to request a real-time interpretation service or a real-time translation service on a user device, and to enable a language service provider to provide a real-time interpretation service or a real-time translation service on a service provider device.

19 Claims, 27 Drawing Sheets

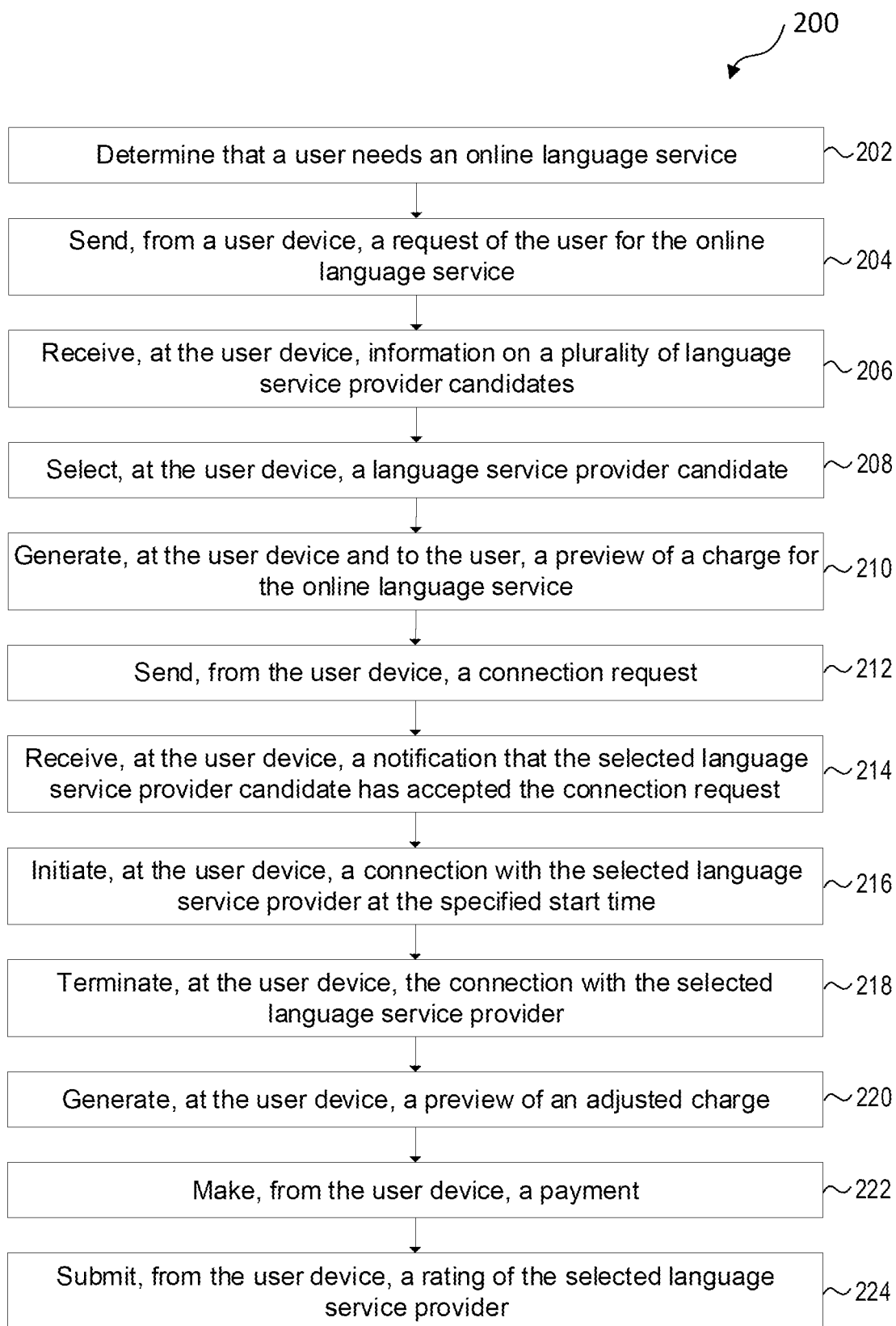

200

| | |
|---|---|
| Determine that a user needs an online language service | ~202 |
| Send, from a user device, a request of the user for the online language service | ~204 |
| Receive, at the user device, information on a plurality of language service provider candidates | ~206 |
| Select, at the user device, a language service provider candidate | ~208 |
| Generate, at the user device and to the user, a preview of a charge for the online language service | ~210 |
| Send, from the user device, a connection request | ~212 |
| Receive, at the user device, a notification that the selected language service provider candidate has accepted the connection request | ~214 |
| Initiate, at the user device, a connection with the selected language service provider at the specified start time | ~216 |
| Terminate, at the user device, the connection with the selected language service provider | ~218 |
| Generate, at the user device, a preview of an adjusted charge | ~220 |
| Make, from the user device, a payment | ~222 |
| Submit, from the user device, a rating of the selected language service provider | ~224 |

FIG. 2

Select a language type ~ 402

Select a proficiency level ~ 404

Select a start time ~ 406

Select an end time ~ 408

Select a specialization ~ 410

Select a preference for a time zone ~ 412

Select a preference for a rating ~ 414

Send a request ~ 416

304

1:17 PM

306

308

302

Start the service

1002

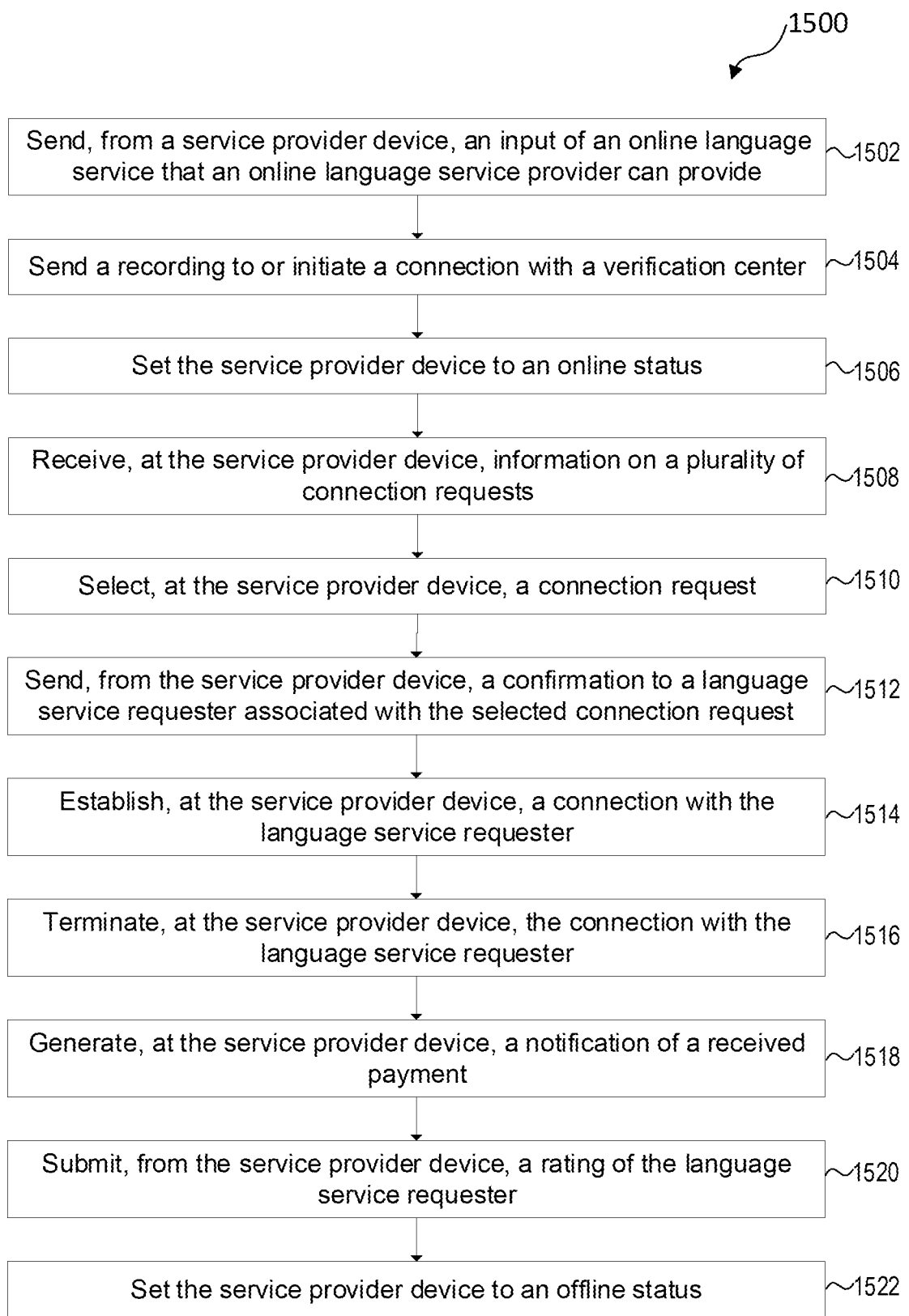

1500

Send, from a service provider device, an input of an online language service that an online language service provider can provide ~1502

Send a recording to or initiate a connection with a verification center ~1504

Set the service provider device to an online status ~1506

Receive, at the service provider device, information on a plurality of connection requests ~1508

Select, at the service provider device, a connection request ~1510

Send, from the service provider device, a confirmation to a language service requester associated with the selected connection request ~1512

Establish, at the service provider device, a connection with the language service requester ~1514

Terminate, at the service provider device, the connection with the language service requester ~1516

Generate, at the service provider device, a notification of a received payment ~1518

Submit, from the service provider device, a rating of the language service requester ~1520

Set the service provider device to an offline status ~1522

FIG. 15

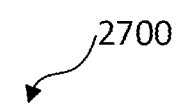

Receive a request for an online language service ~2702

Search in a database for a group of candidates who can provide the service in a requested language type ~2704

Identify a group of candidates who meet a requested proficiency level ~2706

Identify a group of candidates who are available at a requested start time ~2708

Identify a group of candidates who are available at a requested end time ~2710

Identify a group of candidates who can provide a specialized language service ~2712

Identify a group of candidates who are in a requested time zone ~2714

Identify a group of candidates who meet a minimum rating requirement ~2716

Identify a group of candidates who are online ~2718

Send information on a list of profiles of language service provider candidates who can provide the requested service ~2720

FIG. 27

METHODS AND SYSTEMS FOR PROVIDING REAL-TIME ONLINE LANGUAGE SERVICES

CROSS REFERENCE TO RELATED APPLICATION

This patent document claims priority to and benefit of U.S. Provisional Patent Application No. 63/368,938, filed on Jul. 20, 2022. The entire content of the aforementioned patent application is incorporated by reference as part of the disclosure of this application.

TECHNICAL FIELD

This patent document relates to providing online language services from language service providers to language service requesters.

BACKGROUND

In many situations, people may need language interpretation or translation services. For example, a person may need to engage in a conversation or discussion with another person who does not speak the same language at a social event or a professional meeting for which an interpreter or a translator may be needed in person, on the phone, or online remotely. Getting an interpreter or a translator with an adequate interpretation skill level for the conversation or discussion through a language service agency can take time and pre-planning and thus may not be feasible in various situations.

SUMMARY

Real-time language interpretation services are often needed for facilitating personal or professional meetings, conversations, or events where participants may desire interpretation in real time. Various commercial interpretation services are available but usually require pre-engagement and pre-planning of such services, rendering such services impractical or not feasible for various situations where interpretation services are needed. There is a need to enable language service requesters to request interpretation and translation services on demand from various locations at various times in different time zones including off-business hours.

Described herein are methods, apparatus, and systems to facilitate the requesting and the providing of real-time interpretation and translation services. The disclosed methods can enable a language service requester to request a real-time interpretation service or a real-time translation service on a user device. The disclosed methods can also enable a language service provider to provide a real-time interpretation service or a real-time translation service on a service provider device.

In one example aspect, a method enables a user device to interact with a user to receive an online language service from a language service provider at a remote location, where the user device includes a computing device or a mobile communication device such as a smartphone. The method includes sending, from the user device, a request of the user for the online language service. The request includes information including a language type of the online language service selected by the user, a proficiency level of the selected language type selected by the user, and a start time and an end time of the online language service specified by the user. The method further includes receiving, at the user device, information on a list of language service provider candidates who are available to provide the online language service of the selected language type, of the selected proficiency level, and between the specified start time and the specified end time. The method further includes selecting, at the user device, a language service provider candidate based on profiles of the list of language service provider candidates from the received information on the list of language service provider candidates. The method further includes generating, at the user device and to the user, a preview of a charge for the online language service based on the selected language type, the proficiency level of the selected language service provider candidate, and a time interval between the specified start time and the specified end time. The method further includes sending, from the user device, a connection request to connect remotely with the selected language service provider candidate, and receiving, at the user device, a notification that the selected language service provider candidate has accepted the connection request as a selected language service provider. The method further includes initiating, at the user device, a connection with the selected language service provider at the specified start time to begin the online language service provided remotely by the selected language service provider, and terminating, at the user device, the connection with the selected language service provider when the online language service is completed or otherwise terminated.

In another example aspect, a method enables a service provider device for an online language service provider to provide an online language service, where the service provider device includes a computing device or a mobile communication device such as a smartphone. The method includes sending, from the service provider device, an input of the online language service from the online language service provider. The input includes information including a language type of the online language service that the online language service provider can provide, a proficiency level of the language type of the online language service provider, and an availability during which the online language service provider can provide the online language service. The method further includes receiving, at the service provider device, information on a list of connection requests, where the information on each connection request includes a start time, an end time, and a preview of a service fee payable to the online language service provider and based on the language type, the proficiency level of the online language service provider, and a time interval between the start time and the end time. The method further includes selecting, at the service provider device and based on the received information on the list of connection requests, a connection request, and sending, from the service provider device, a confirmation to a language service requester associated with the selected connection request that the online language service provider has accepted the connection request as a confirmed language service provider. The method further includes establishing, at the service provider device, a connection with the language service requester at the start time to begin the online language service, and terminating, at the service provider device, the connection with the language service requester when the online language service is completed or otherwise terminated.

In yet another example aspect, a method for sorting language service provider candidates includes receiving, by one or more computing devices in a communication network, a request for an online language service, the request including information on a language type, a proficiency level, a start time, and an end time. The method further includes searching, in response to the received request, in a database of language service provider candidates stored on the one or more computing devices, for a first group of language service provider candidates, whose database entries indicate that each candidate in the first group is capable of providing language service in the language type. The method further includes identifying, from the first group of language service provider candidates, a second group of language service provider candidates, whose database entries indicate that each candidate in the second group meets the proficiency level requirement. The method further includes identifying, from the first group of language service provider candidates, a third group of language service provider candidates, whose database entries indicate that each candidate in the third group is indicated to be available at the start time. The method further includes identifying, from the first group of language service provider candidates, a fourth group of language service provider candidates, whose database entries indicate that each candidate in the fourth group is indicated to be available at the end time. The method further includes sending, in response to the received request for the online language service, information including a list of profiles of language service provider candidates that are in all of the second, third, and fourth groups of language service provider candidates.

These, and other, aspects are described in the present document.

BRIEF DESCRIPTION OF THE DRAWINGS

FIG. 2 is a flowchart of a method for requesting an online language service in accordance with one or more embodiments of the present technology.

FIG. 15 is a flowchart of a method for providing an online language service in accordance with one or more embodiments of the present technology.

FIG. 27 is a flowchart of a method for sorting language service provider candidates in accordance with one or more embodiments of the present technology.

DETAILED DESCRIPTION

Figure 1:
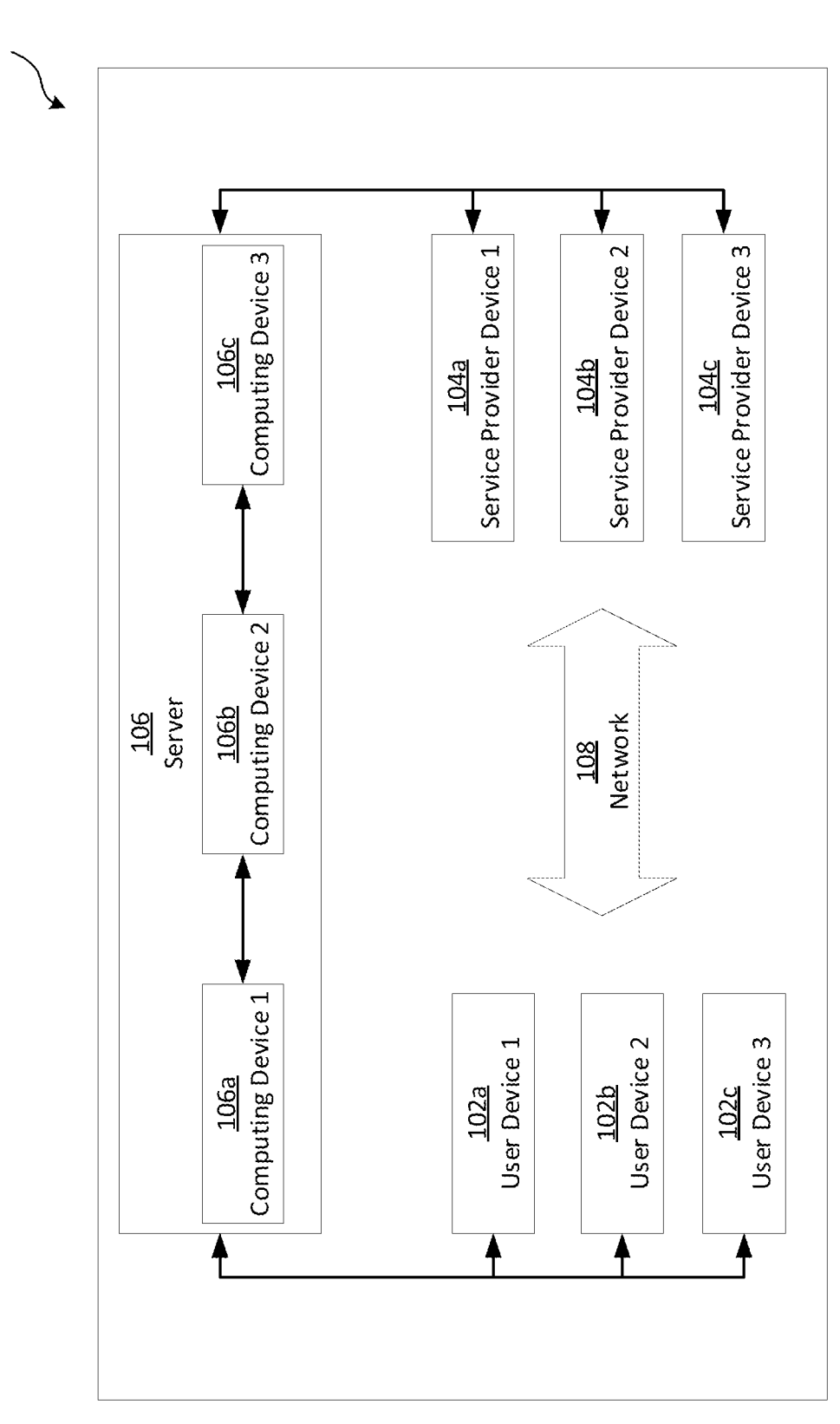
FIG. 1 is a diagram of an example of a system that can implement the requesting and the providing of an online language service in accordance with one or more embodiments of the present technology.

In many situations, people may need language interpretation or translation services. People may meet other people who do not speak the same language in a professional meeting or event, such as a trade convention, a business dinner, a business negotiation, etc. People may meet other people who do not speak the same language on a personal or informal occasion, such as on the public transportation, on a hike, in a bar or a club, at a social event, etc. People may find friends or dates who do not speak the same language on a social networking application. People who do not speak an official language may need to communication with immigration officers, police officers, healthcare providers at hospitals or clinics, emergency medical technicians (EMTs), post office employees, national park rangers, etc. People may travel to a place where the local people speak a different language, and they may need to communicate with restaurant servers, hotel employees, shop keepers, etc. People may need to communicate with contractors, housekeepers, or gardeners that do not speak the same language. In some situations, people may need an interpreter or a translator to help them understand communications with lawyers, medical doctors, financial advisors, real estate agents, etc. People can plan for some of these situations but the need for interpretation or translation services can arise unexpectedly or spontaneously. Getting an interpreter or a translator through a language service agency can take time (sometimes up to a few days) and is not a feasible solution in such situations.

Professional interpreters engaged by commercial interpretation services may not be fully utilized by their employers. They may be interested in offering their services to others when such offering is not in conflict with their employment and is convenient for their personal schedules. In addition, various people who are skilled in different languages and cultural backgrounds may be interested in providing interpretation services or otherwise available to provide interpretation services to generate income. The technology disclosed in this patent document provides an online platform to meet various interpretation needs. The technology disclosed in this patent document enables people with multilingual skills to offer themselves as potential language service providers online. The technology disclosed in this patent document enables rendering or scheduling of real-time interpretation services for language service requesters via mobile or desktop applications or online software via an Internet browser at locations with communication or Internet services and at any time in different local time zones.

This patent document discloses methods, apparatus, and systems that can be implemented to request or provide an online language service on demand. Anyone, especially interpreters and translators, can sign up to provide interpretation or translation services on a service provider device. A language service provider can enter the types of languages the provider speaks and the proficiency level of each of these languages. In some embodiments, the language service provider can be required to submit a video or audio recording to a verification center or connect through video or audio conferencing with the verification center to prove the provider's proficiency in the language types. The language service provider can enter the provider's availability and location. If the provider is a certified interpreter or translator, the provider can submit the relevant certificate. If the provider has specialized knowledge in the legal or medical field, the provider can submit proof of such specialization. In some embodiments, a background check can be conducted on the language service provider before the provider can be accepted into a database of language service provider candidates stored on a server.

A person can access the mobile/desktop application or online software (via an Internet browser) to request an online language service on a user device. A language service requester can specify a language type, a proficiency level of the language type, a start time, an end time, a specialization, a preference for a time zone, a preference for a rating of a language service provider, etc. In some embodiments, the request can be for an instantaneous service once a suitable service provider is available to meet the requester's requirements and such a service may be provided without any specified duration if the suitable service provider is available and willing to provide the service. In some embodiments, the user device can detect that the user is in a conversation where the user cannot communicate effectively. The user device can determine that an interpretation service is needed, and the user device can automatically generate a request for an online language service. The request can be sent to the server that stores the database of the language service provider candidates. When the server receives the request for the online language service, it can identify and recommend language service provider candidates that can meet the requirements of the request. In some embodiments, one language service provider candidate can be an automatic tool powered by artificial intelligence. The language service requester can see the profiles of these recommended candidates on the user device and can select which candidate the requester wants to proceed with. In some embodiments, a preview of a charge for the online language service provided by the selected candidate can be generated. The language service requester can decide to continue with the selected candidate or select a different candidate that charges less. In some embodiments, the automatic tool powered by artificial intelligence can charge less than a human language service provider.

Once the language service requester is satisfied with the selection, a connection request can be sent to the selected candidate. The selected candidate can accept or ignore the connection request. If the selected candidate accepts the connection request, a notification can be sent to the user device notifying the language service requester that the selected candidate has accepted the connection request. Either the language service requester or the language service provider can start the service at the specified start time. Either the language service requester or the language service provider can terminate the service at or after the specified end time. In some embodiments, the service can start automatically at the specified start time and terminate automatically at the specified end time. In some embodiments, the service can be started right away by either the language service requester or the language service provider. In some embodiments, the service can be terminated by either the language service requester or the language service provider as soon as the service is completed. The charge for the language service can be adjusted based on the actual connection time and charged to the language service requester. The language service provider can get a notification that a payment has been posted to their bank account. The language service requester can rate the quality of the service received and the professionalism of the language service provider. In some embodiments, the language service provider can rate the language service requester such as on their respectfulness. The present disclosure can enable language service requesters to request for real-time online language services quickly and conveniently. Because language service providers are available in different locations and in different time zones, the technology disclosed in this patent document can be implemented to enable language service providers to provide requested language services during or after business hours.

FIG. 1 is a diagram of an example of an interpretation service system 100 that can implement the requesting and the providing of an online language service in accordance with one or more embodiments of the present technology. System 100 is structured to include a computer server 106 that includes computing devices or storage devices 106a, 106b, and 106c in communication with a communication network 108. System 100 can enable users to request interpretation services by using applications associated with requesting online language services on their user devices 102a, 102b, and 102c. System 100 can enable potential language service providers to provide interpretation services by using applications associated with providing online language services on their service provider devices 104a, 104b, and 104c. User devices 102a, 102b, and 102c and service provider devices 104a, 104b, and 104c can be in communication with server 106 via network 108. Language service requesters and potential language service providers can interact via system 100 to engage and complete interpretation services.

User devices 102a, 102b, and 102c and service provider devices 104a, 104b, and 104c can include computing devices (e.g., personal computers such as laptops or desktop computers) and mobile communication devices (e.g., smart phones or tablets). User devices 102a, 102b, and 102c and service provider devices 104a, 104b, and 104c can include smartphones, tablets, wearable smart devices, video teleconferencing devices, head mounted displays, etc. User devices 102a, 102b, and 102c can be independent from each other. Service provider devices 104a, 104b, and 104c can be independent from each other. User devices 102a, 102b, and 102c can be used to request an online language service. Service provider devices 104a, 104b, and 104c can be used to provide an online language service.

Server 106 can include computing devices 106a, 106b, and 106c interconnected by a wireless network or a wired network. The wired network can include a local area network (LAN), a wide area network (WAN), a software-defined wide-area network (SD-WAN), the Internet, etc. Computing devices 106a, 106b, and 106c can each include a processing unit, a memory, a storage unit, an input/output (I/O) interface, etc. In some embodiments, server 106 can be implemented by a commercial cloud-computing platform, such as but not limited to, Amazon Web Services (AWS). Server 106 can include a mixture of infrastructure as a service (IaaS), platform as a service (PaaS), and packaged software as a service (SaaS). Server 106 can be used to store and sort a database of language service provider candidates.

User devices 102a, 102b, and 102c can communicate with server 106 by a wireless network or a wired network. Service provider devices 104a, 104b, and 104c can communicate with server 106 by a wireless network or a wired network. User devices 102a, 102b, and 102c can communicate with service provider devices 104a, 104b, and 104c by network 108. Network 108 can be a wireless network (e.g., cellular network) or a wired network. The wired network can include coper transmission cables, optical transmission fibers, routers, firewalls, switches, gateway computers and/or edge servers, etc. User devices 102a, 102b, and 102c and service provider devices 104a, 104b, and 104c can have audio and/or video capabilities. User devices 102a, 102b, and 102c can establish an audio and/or video connection with service provider devices 104a, 104b, and 104c via network 108.

FIG. 2 is a flowchart of a method 200 for requesting an online language service in accordance with one or more embodiments of the present technology. In some embodiments, before a user can request an online language service, the user may be required to download an application associated with requesting online language services from an application store to a user device and agree to the terms of agreement of using the application. The application store can have a description of the application. In some embodiments, the online language service can be integrated into a commercial video conferencing application as a plug-in or a module. The user may be required to sign up for an account associated with requesting online language services. The user may sign up for the account with an email address. The user may sign up for the account with a phone number and may be required to enter a verification code sent to the mobile device associated with the phone number. The user may sign up for the account with a social networking account associated with the user. The user may need to enter information such as their name, gender, address, date of birth, profile picture, contact information, etc. Once the user signs up for the account, the user may be taken to a training page or an orientation page to learn how to use the application. Method 200 can be implemented on user devices 102a, 102b, and 102c. The operations of method 200 will be explained with reference to FIGS. 3-14.

Figure 3:
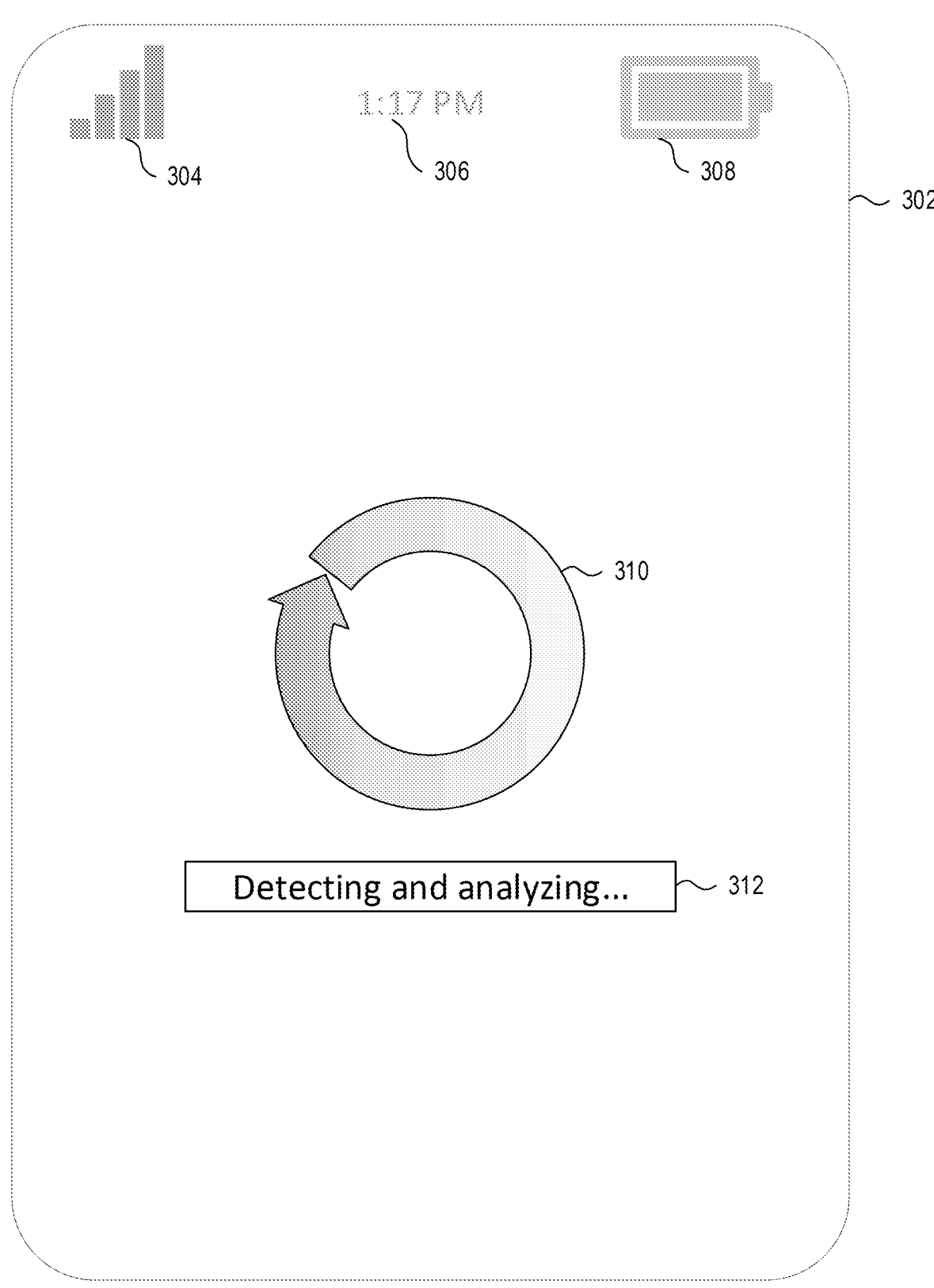
FIGS. 3-14 illustrate the method for requesting the online language service as shown in FIG. 2 in accordance with one or more embodiments of the present technology.

At operation 202, a user device can determine whether a user needs an online language service. For example, as shown in FIG. 3, user device 302 can determine whether a user needs an online language service. User device 302 can be one of user devices 102a, 102b, and 102c. User device 302 can display icon 304 to indicate the strength of a wireless service or a Wi-Fi connection. User device 302 can display icon 306 to indicate the time. User device 302 can display icon 308 to indicate the battery level. User device 302 can display icon 310 and text box 312 to indicate that user device 302 is actively detecting a conversation between the user and a converser and analyzing the conversation. User device 302 can include a microphone (not shown in FIG. 3) that can detect audio inputs. User device 302 can send the detected audio inputs to server 106. Server 106 can analyze the detected audio inputs and determine if an online language service is needed. Server 106 can determine that an online language service is needed if server 106 determines that a proficiency level of the user in the language type of the conversation is below a minimum proficiency level needed to communicate effectively. For example, if in the detected audio inputs, two languages are spoken back and forth, one side's grammar for the language type is faulty, one side speaks disproportionally more than the other side, or words and phrases such as "yes," "no," "OK," "do you understand," or "you know what I mean" are used frequently, server 106 may determine that an online language service is needed. In some embodiments, server 106 can determine that legal or medical terms are used in the detected audio inputs and may recommend a language service with a legal or medical specialization. In some embodiments, user device 302 can include a camera (not shown in FIG. 3) that can detect video inputs. User device 302 can send the detected video inputs to server 106. Server 106 can analyze the detected video inputs and determine if an online language service is needed. Server 106 can determine that an online language service is needed if server 106 determines that a proficiency level of the user in the language type of the conversation is below a minimum proficiency level needed to communicate effectively. For example, if in the detected video inputs, hand gestures, nodding, or shaking head are frequent, server 106 may determine that an online language service is needed. Server 106 can make such determinations using algorithms based on artificial intelligence and machine learning. In some embodiments, user device 302 can make such determinations instead of sending the detected audio and/or video inputs to server 106 for server 106 to determine. Once an online language service is determined to be needed, user device 302 can automatically prompt the user to request an online language service at operation 204. In some embodiments, user device 302 and/or server 106 can determine the language type needed for the online language service and can automatically send a request for a language service provider in that language type. In some embodiments, a user can disable or opt out the automatic detection and/or request and only requests an online language service at operation 204 when the user decides to.

Figure 4:
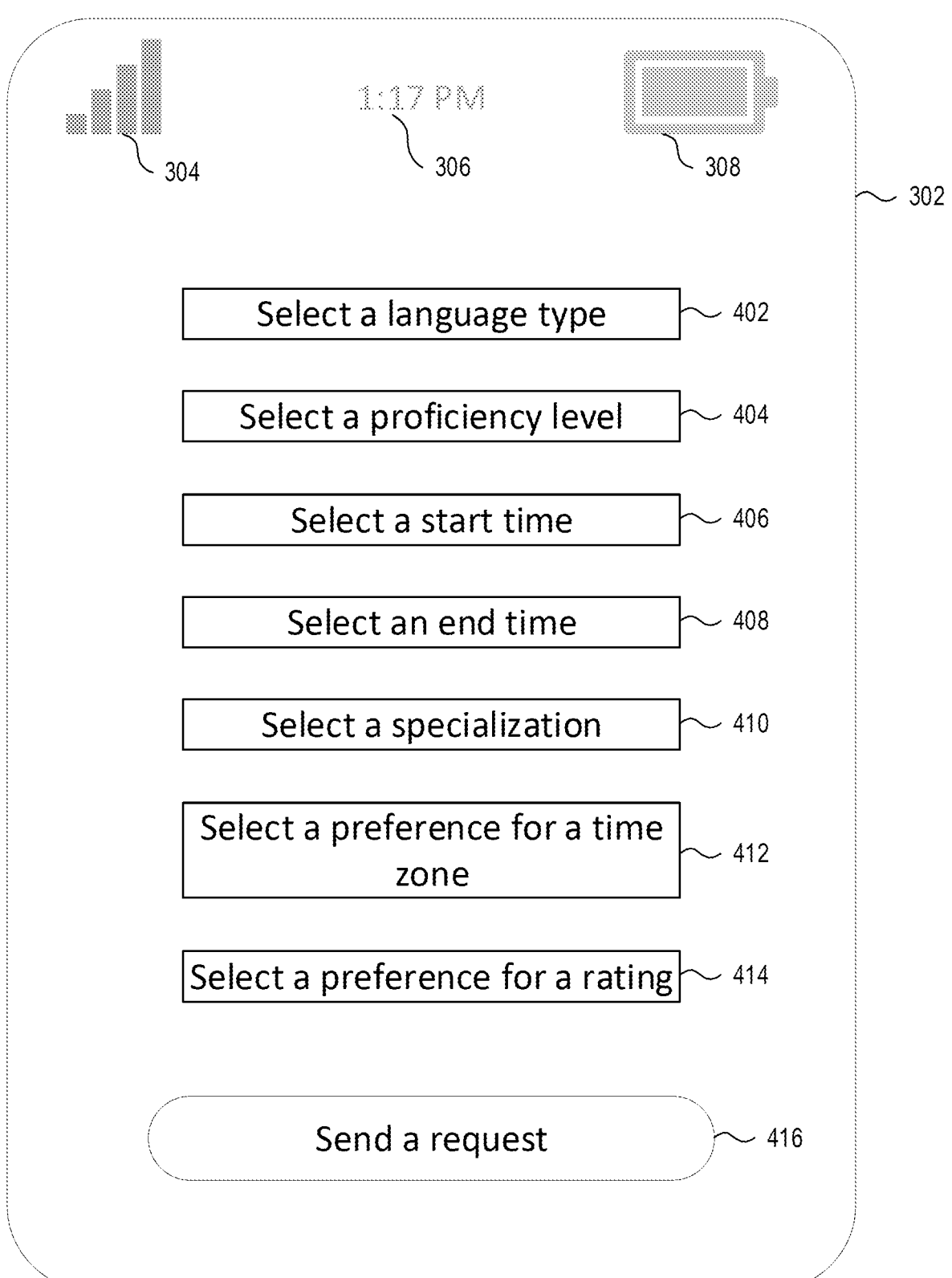

At operation 204, the user device can send a request of the user for the online language service. For example, as shown in FIG. 4, user device 302 can send a request of the user for the online language service. The user can select a language type, such as English, Spanish, French, Chinese, etc., from drop down menu 402. The user can select a proficiency level for the language service needed, such as beginner, intermediate, advanced, etc., from drop down menu 404. The user can select or input a start time, such as immediately, at 2 PM today, at 11 AM on next Wednesday, etc., from drop down menu 406. The user can select or input an end time, such as half an hour later, at 2:30 PM today, at 12 PM on next Wednesday, etc., from drop down menu 408. In some embodiments, there is no need for operations to select or input a start time or an end time. The online language service can be started right away when needed. The online language service can be terminated as soon as the service is completed. The user can select or input a specialization for the language service needed, such as legal, medical, finance, real estate, etc., from drop down menu 410. In some embodiments, user device 302 can generate a warning or a push notification that the application associated with requesting online language services is not liable for the miscommunications between the user and the specialized language service providers. The user assumes the risk of getting legal or medical advice interpreted by the specialized language service providers. The user may use drop down menu 412 to select a preference for a time zone where the language service providers are located, such as any time zone, in the same time zone as the user, or within three hours of the time zone of the user, etc. In some embodiments, the application can detect the location and determine the time zone of the user if the user allows the application to detect the location. The user can select a preference for a rating of the language service providers, such as five starts only, at least four stars, etc., from drop down menu 414. In some embodiments, some request entries can be mandatory, such as the language type and the start time, while other request entries can be optional. Once all necessary request entries are selected or entered, the user can send the request for the specified online language service using button 416.

Figure 5:
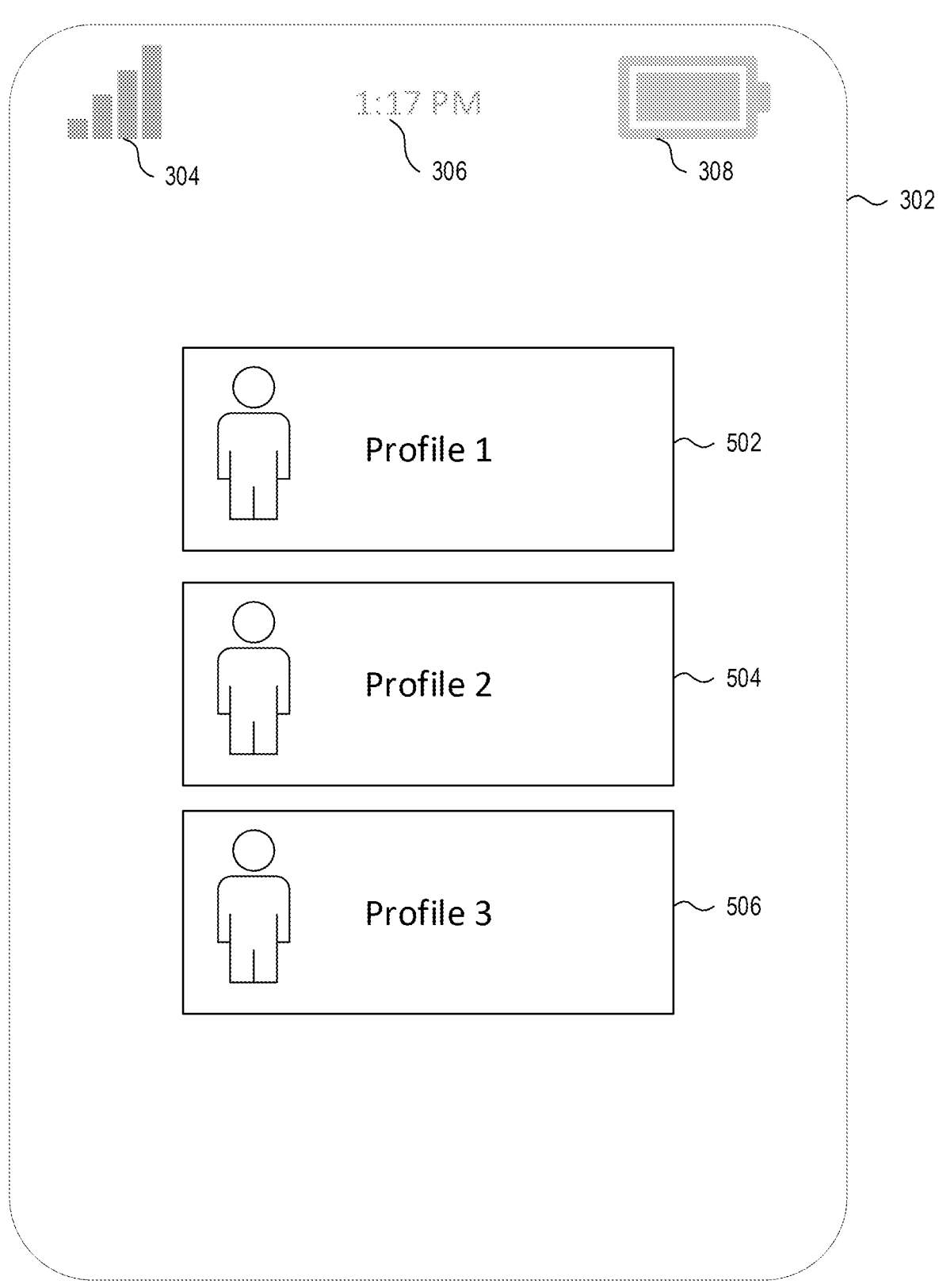

At operation 206, the user device can receive information on a list of language service provider candidates. For example, as shown in FIG. 5, user device 302 can receive information on a list of language service provider candidates. The information on the list of language service provider candidates can be displayed as profile 502, profile 504, and profile 506. In some embodiments, profile 502, profile 504, and profile 506 can be associated with service provider devices 104a, 104b, and 104c, respectively. In some embodiments, more or fewer profiles can be provided. In some embodiments, if the user dismisses some or all of the profiles provided, new profiles can be provided. Each profile can include basic information on the language service provider candidate, such as their name, gender, location such as city, country, or time zone, age, profile picture, etc. Since only language service provider candidates who are able to provide the requested online language service are listed, there is no need to display the language types the candidates speak, the proficiency levels of the candidates, the availability of the candidates, the specializations of the candidates, the ratings of the candidates, etc. However, in some embodiments, this information can be displayed in each profile on user device 302 so that the user can visualize all aspects of the language service provider candidates and fully evaluate on the language service provider candidates based on this information. In some embodiments, the profiles can be presented on a map showing the approximate locations, such as cities, states, and countries, of the language service provider candidates instead of on a list. In some embodiments, one language service provider candidate can be an automatic tool powered by artificial intelligence. In some embodiments, the automatic tool can be used for simple tasks. The automatic tool can learn from interpretation services provided by human language service providers and improve its interpretation skills. In some embodiments, the automatic tool can learn from specialized interpretation services and provide specialized language services such as legal or medical services. A warning or a push notification can be generated on user device 302 notifying the user that the automatic tool is not a human and the user assumes the risk of getting legal or medical advice interpreted by the automatic tool. In some embodiments, if there are no available language service providers, the user can choose to try again or opt to receive a notification when a language service provider that meets the user's requirements is available. In some embodiments, if there are no available language service providers, server 106 can send incentives, such as a discount for a future service, to the user.

Figure 6:
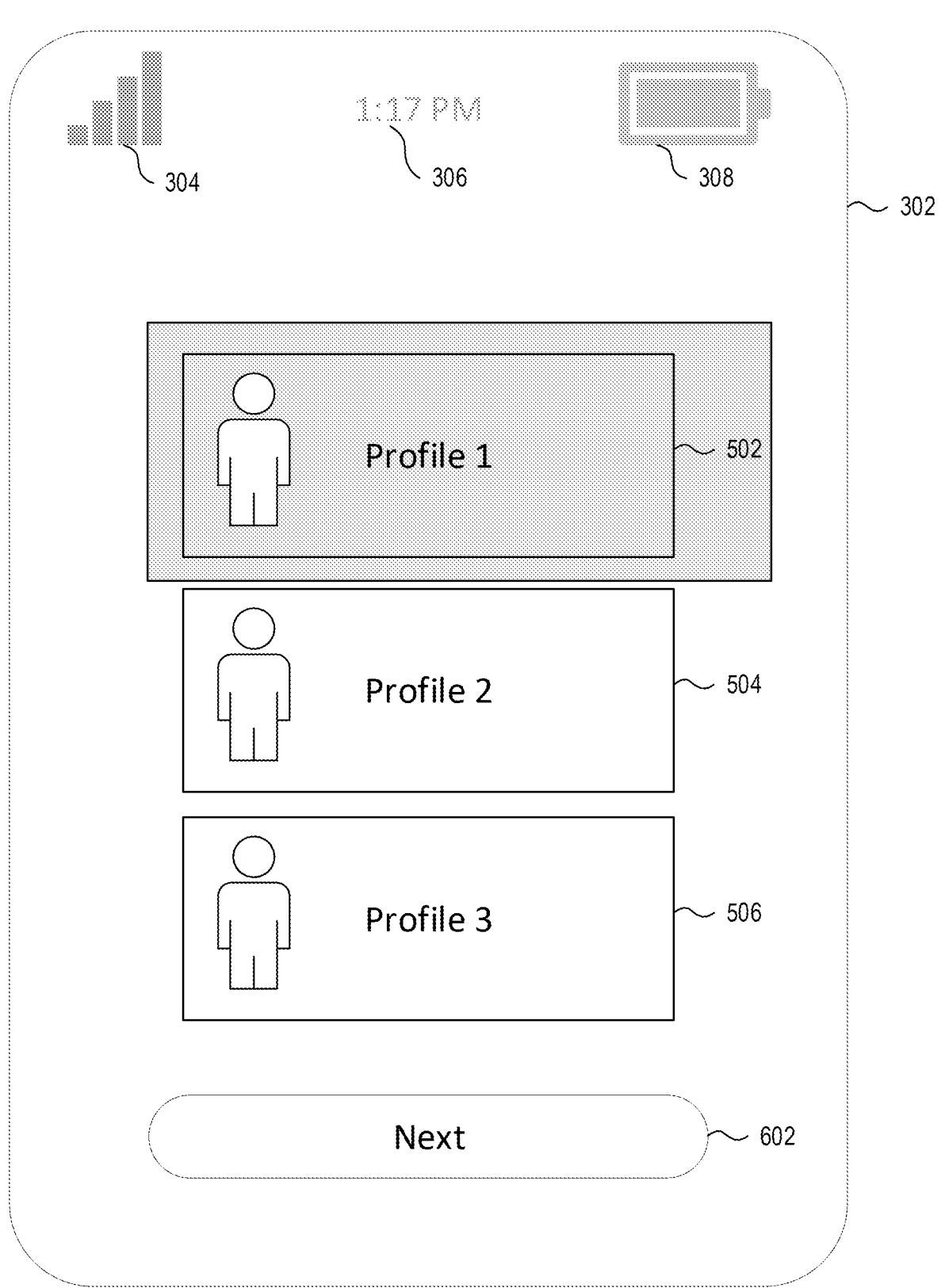

At operation 208, the user can select a language service provider candidate on the user device. For example, as shown in FIG. 6, the user can select a language service provider candidate on user device 302. The user may select a language service provider candidate based on the time zone where the language service provider candidate is located. For example, some users may prefer the language service provider candidates to be in the same time zone as them. Some users may prefer the language service provider candidates to be in a country where the requested language is originated, such as China for a Chinese language service. The user may select a language service provider candidate based on the proficiency level of the language service provider candidate for the specified language type. For example, some users may prefer the language service provider candidates to have an advanced level of the requested language type. Some users may prefer the language service provider candidates to have an intermediate level of the requested language type if the situation requiring the language service is not an official business. The user may select a language service provider candidate based on the availability of the language service provider candidate. For example, even though the user may request for a one-hour service, the user may prefer a language service provider candidate who is available for another half an hour after the service end time just in case the conversation runs longer. The user may select a language service provider candidate based on the rating of the language service provider candidate. For example, some users may only want five-star language service provider candidates. Some users may accept language service provider candidates who have a rating of four stars and above. Once the user selects a language service provider candidate, the profile of the selected language service provider candidate can be in a different shade. For example, profile 502 is selected in FIG. 6, and it is in a grey shade. The user can then use button 602 to move to operation 210.

Figure 7:
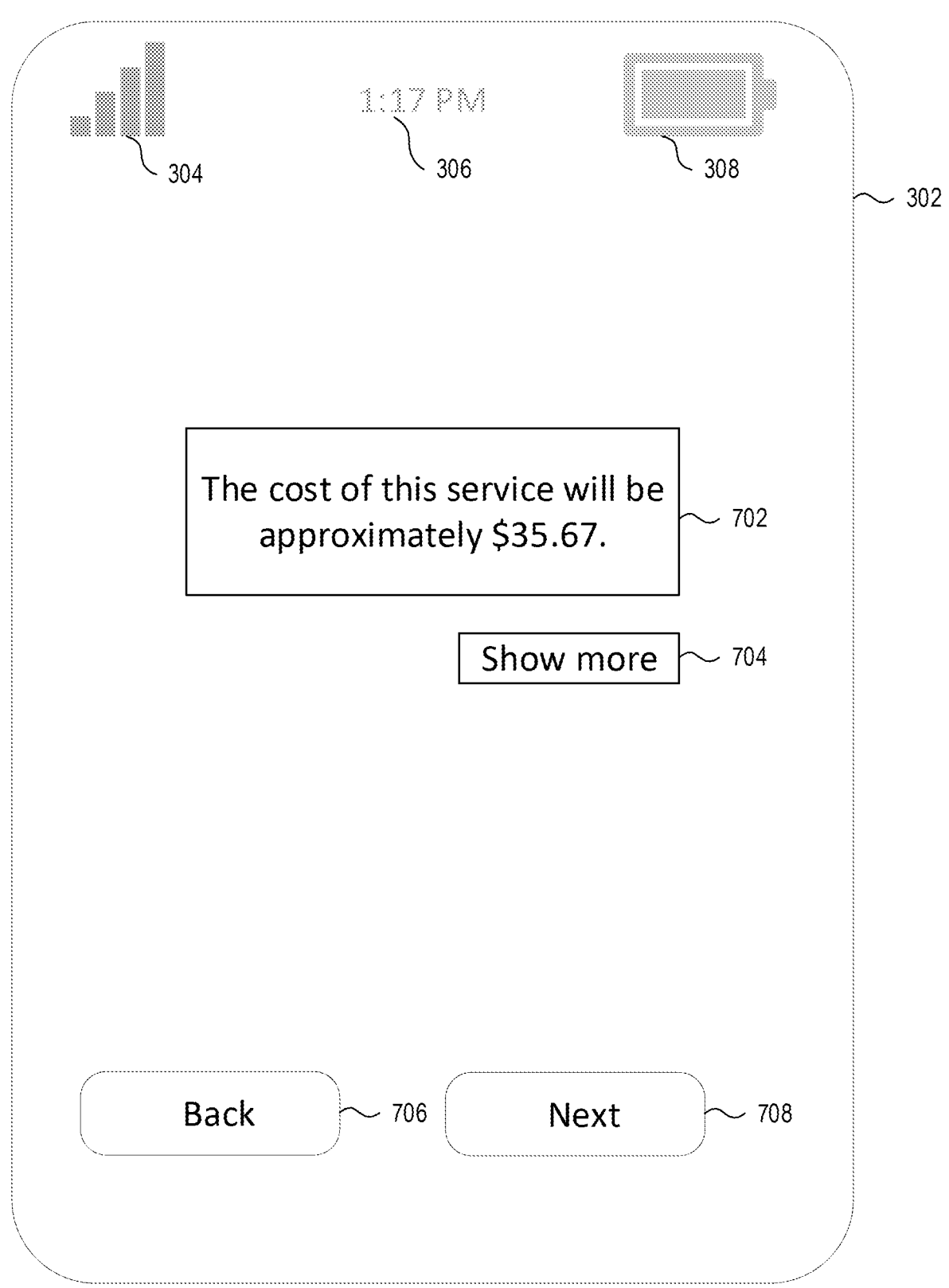

At operation 210, a preview of a charge for the online language service can be displayed on the user device. For example, as shown in FIG. 7, a preview of a charge for the online language service can be displayed in text box 702 on user device 302. The preview of the charge can be generated by server 106 and sent to user device 302. In some embodiments, the preview of the charge can be generated by user device 302. Text box 702 can show the cost of the service based on the language type. Some common languages, such as English, Spanish, etc., with more language service providers can be cheaper than some uncommon languages, such as Dari, Icelandic, etc., with fewer language service providers. The cost of the service can be based on the proficiency level of the selected language service provider candidate. A language service provider with an advanced level can charge more than a language service provider with an intermediate level. The cost of the service can be based on duration of the requested service. There can be an hourly rate for each language service provider based on the language type they speak, their proficiency level, and the ratings of the language service providers. Language service providers with a five-star rating can charge more than language service providers with a lower rating. In some embodiments, language service providers can set their own hourly rate. In some embodiments, an initiation fee can be charged to every service despite the duration of the service. The cost of the service can be based on the add-ons to the requested service. For example, if the requested service requires a legal specialization or a medical specialization, it can be more expensive. If the user requests for a language service provider in a time zone that requires the language service provider to work at late hours or early hours, the cost of the service can be higher. If the user requests for a video connection instead of an audio connection, the service can be more expensive. In some embodiments, the cost of the service can be based on the number of available language service providers at the time the request is made. For example, if there are many requests at a time when there are fewer available language service providers, the cost of the service can be higher. The pricing based on supply and demand can regulate the number of available language service providers and encourage more language service providers to go online when there is a higher demand. In some embodiments, the cost of the service provided by the automatic tool powered by artificial intelligence can be lower than the cost of the service provided by a human. If the user wants to know the breakdown and the explanation of the preview of the charge, they can click on text box 704 to expand the details of the charge. If the user is satisfied with the preview of the charge, they can move to operation 212 with button 708. If the charge is too high for the user, they can go back to operation 208 with button 706 to select other candidates that may be cheaper.

Figure 8:
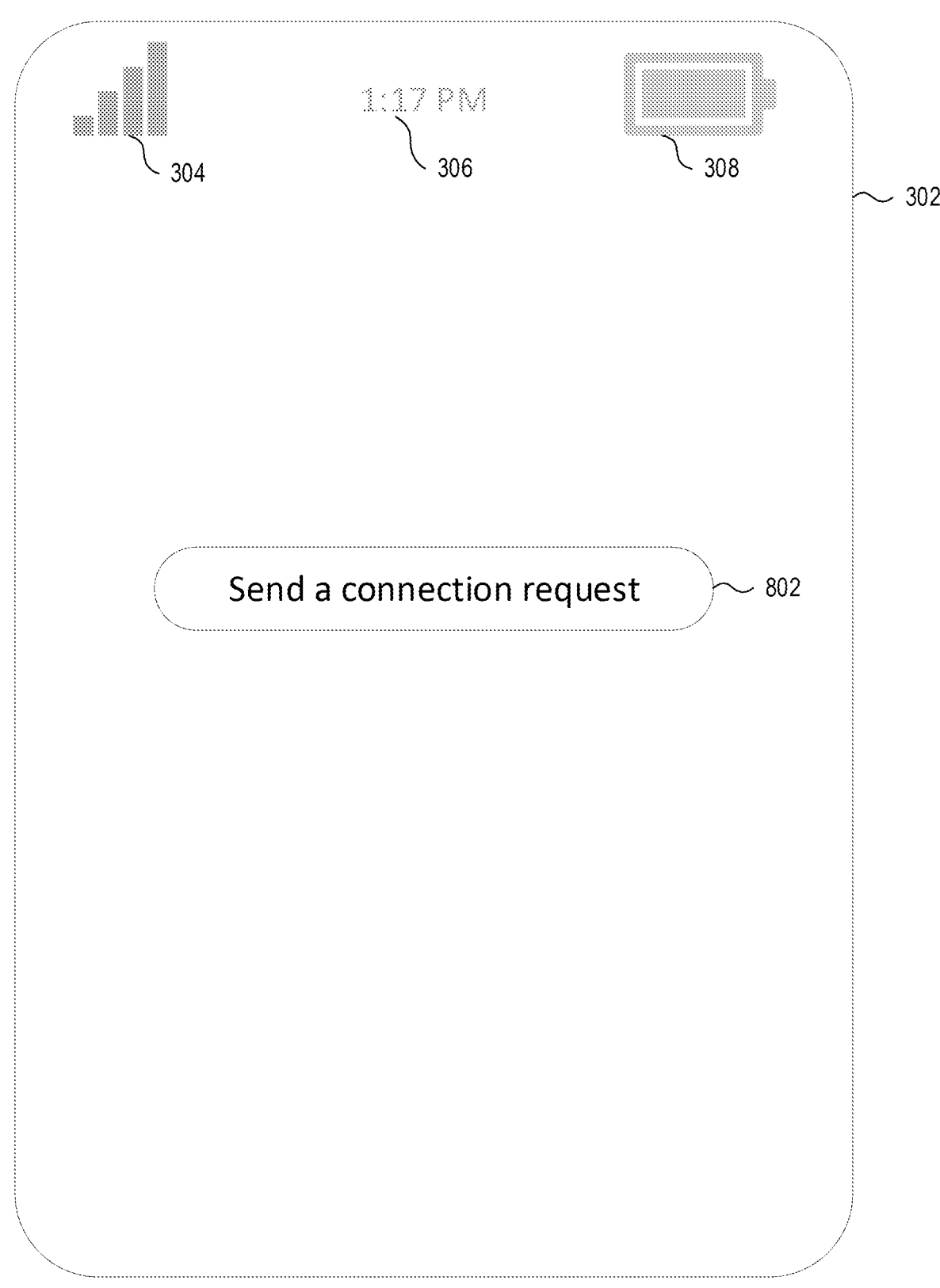

At operation 212, the user device can send a connection request to the selected language service provider candidate. For example, as shown in FIG. 8, user device 302 can send a connection request with button 802 to the selected language service provider candidate.

Figure 9:
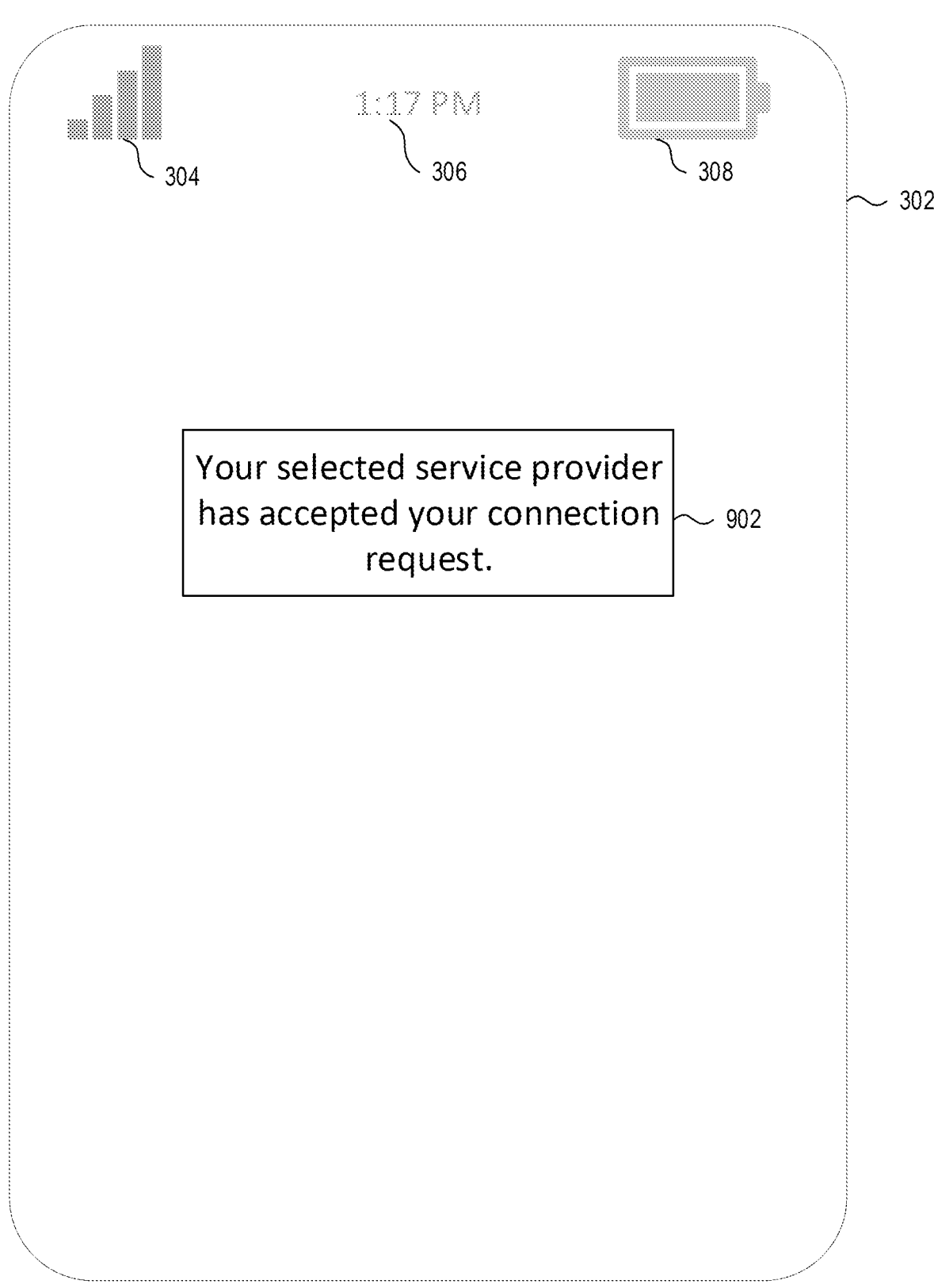

At operation 214, the user device can receive a notification that the selected language service provider candidate has accepted the connection request. For example, as shown in FIG. 9, user device 302 can receive a notification in text box 902 that the selected language service provider candidate has accepted the connection request to be the selected language service provider. If user device 302 receives a notification that the selected language service provider candidate has declined the connection request, the user can go back and select another language service provider candidate.

Figure 10:
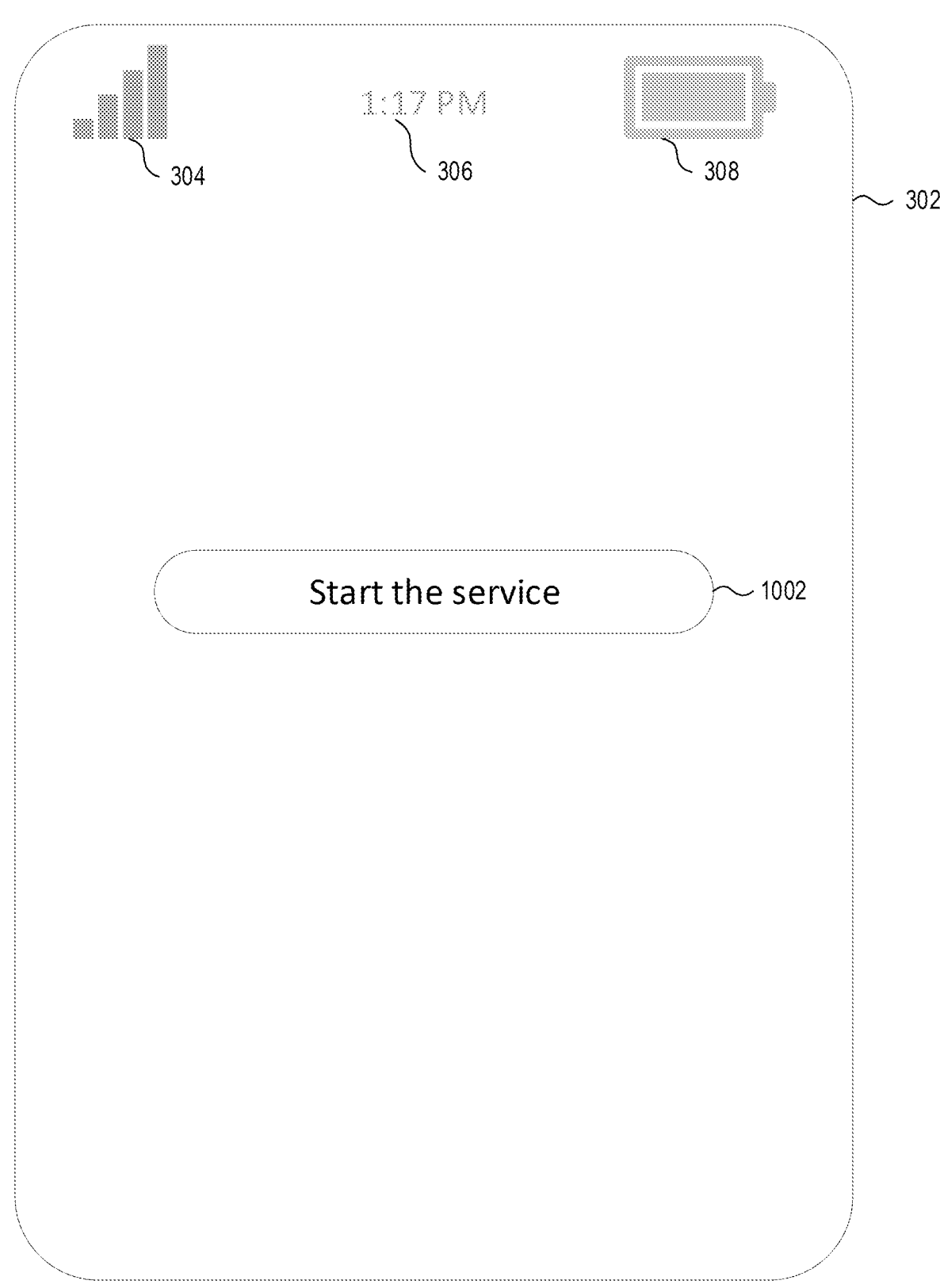

At operation 216, the user device can initiate a connection with the selected language service provider at the specified start time. For example, as shown in FIG. 10, user device 302 can initiate a connection with the selected language service provider at the specified start time. The connection can be secure, and the communications can be confidential. In some embodiments, the user may need to manually start the service with button 1002. In some embodiments, user device 302 can automatically start the service at the specified start time, such as immediately, in half an hour, at 2 PM on next Wednesday, etc. In some embodiments, user device 302 can start the service right away if no start time is specified. The connection can be a video connection using the video conferencing capability of user device 302. In some embodiments, the connection can utilize a built-in video conferencing interface of the application associated with requesting online language services. In some embodiments, the connection can be automatically directed to and completed by a commercial video conferencing application installed on user device 302. The connection can be an audio connection using the audio capability of user device 302, such as a phone call. In some embodiments, the connection can utilize a built-in audio calling interface of the application associated with requesting online language services. In some embodiments, the selected language service provider can also start the service on the service provider device and the user can accept the call to establish the connection. In some embodiments, a third party can be added to the connection. For example, if the user is interviewing with an immigration officer, there can be a three-way audio or video conference among the user, the immigration officer, and the language service provider. In some embodiments, the user and the immigration officer can be in person and the language service provider can be remote. In some embodiments, all three parties to the three-way audio or video conference can be remote. In some embodiments, all three parties to the language service can be in person. For example, the user may be shopping in a store and may request a language service provider to come to the store to help the user in person. Server 106 may check the geographical locations of language service providers near the user who indicate that they are comfortable with providing language services in person. Server 106 may determine the time it takes for a specific provider to travel (e.g., by public transportation, by on-demand car services, on foot, etc.) to the user. The user can select a provider that can show up the quickest or before a certain time if the user is not in a rush. In some embodiments, the cost of the in-person language service provider can be higher than a remote language service provider. In some embodiments, the time it takes for the in-person language service provider to travel to the user may be treated as part of the duration of the language service. In some embodiments, the cost of the transportation (e.g., the cost of the on-demand car service) can be added to the total cost of the language service. In some embodiments, if the user enjoys working with the selected language service provider during the service, the user can schedule a follow-up service with the same language service provider through the application associated with requesting online language services. In some embodiments, the user can communicate with the language service provider via instant and/or text messages.

Figure 11:
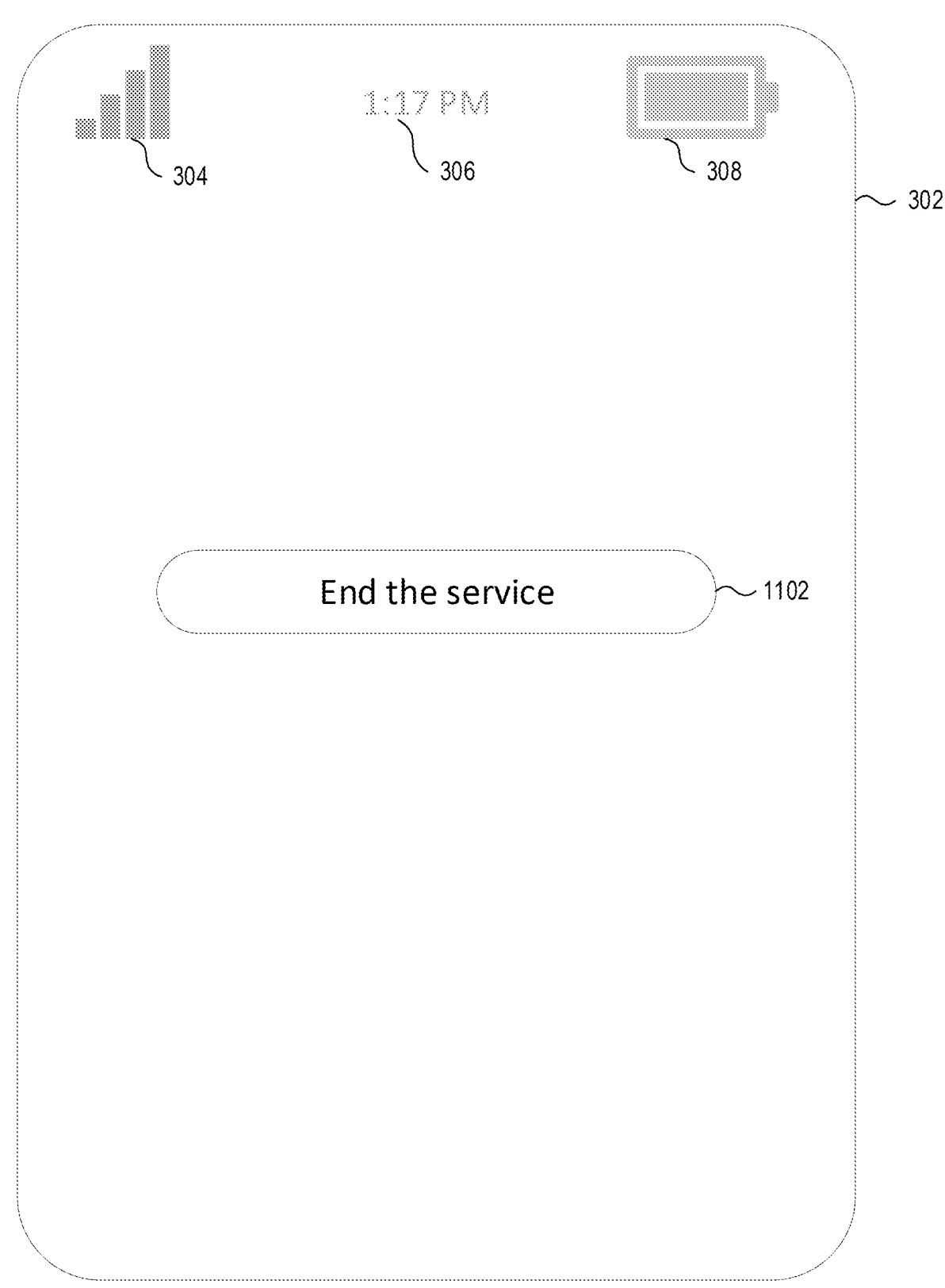

At operation 218, the user device can terminate the connection with the selected language service provider. For example, as shown in FIG. 11, user device 302 can terminate the connection with the selected language service provider. In some embodiments, user device 302 can automatically terminate the service at the specified end time. In some embodiments, user device 302 can terminate the service as soon as the service is completed if no end time is specified. In some embodiments, the user can manually end the service with button 1102. This can allow for situations where the service may be needed for a longer or shorter time than planned. In some embodiments, the selected language service provider can also end the service on the service provider device. In some embodiments, the user can terminate the service call if the nature of the service is different from what it is intended to be. For example, the user may terminate the service when the provider renders the service in some undesirable manner to the user. As an example, if the language service provider starts to inject religious or political views in the interpretation or translation to the extent that the user does not like, the user can terminate the session for the service. For another example, if the language service provider starts to use language unacceptable to the user or harass the user, the user can terminate the session for the service. The user can use the application to report unsatisfactory services including any harassment or other inappropriate behaviors by the language service provider and such report will be processed and evaluated to determine appropriate actions such as providing service credits or other compensatory offers to the reporting user or certain punitive actions against the reported service provider.

Figure 12:
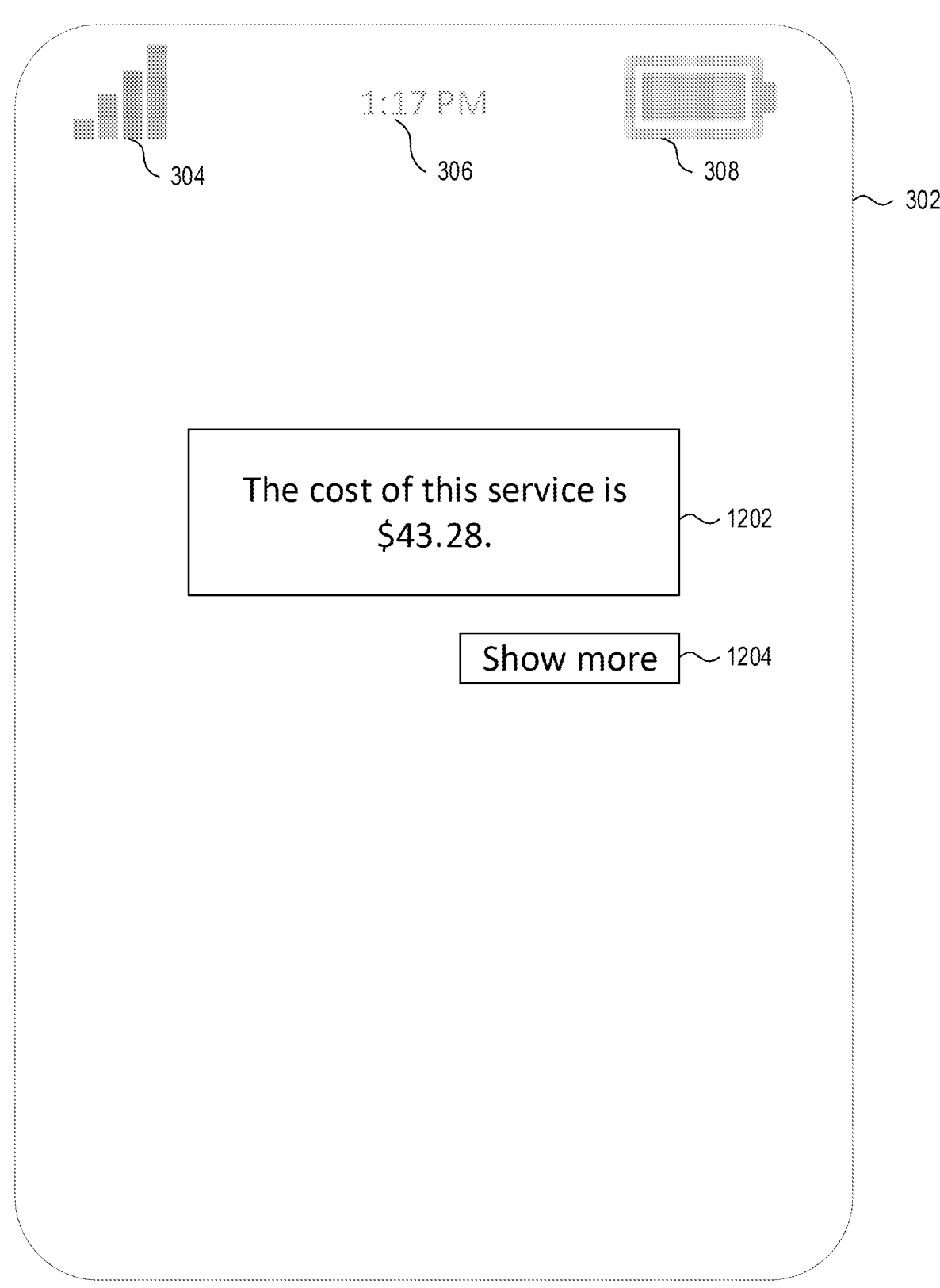

At operation 220, a preview of an adjusted charge for the online language service can be displayed on the user device. For example, as shown in FIG. 12, a preview of an adjusted charge for the online language service can be displayed in text box 1202 on user device 302. The preview of the adjusted charge can be generated by server 106 and sent to user device 302. In some embodiments, the preview of the adjusted charge can be generated by user device 302. The adjusted charge can show the cost of the service based on the actual duration of the service. For example, if the actual duration is longer than the requested duration, the cost can go up. If the actual duration is shorter than the requested duration, the cost can go down. If the user wants to know the breakdown and the explanation of the preview of the adjusted charge, they can click on text box 1204 to expand the details of the adjusted charge. In some embodiments, the user can choose to add a tip to the total charge.

Figure 13:
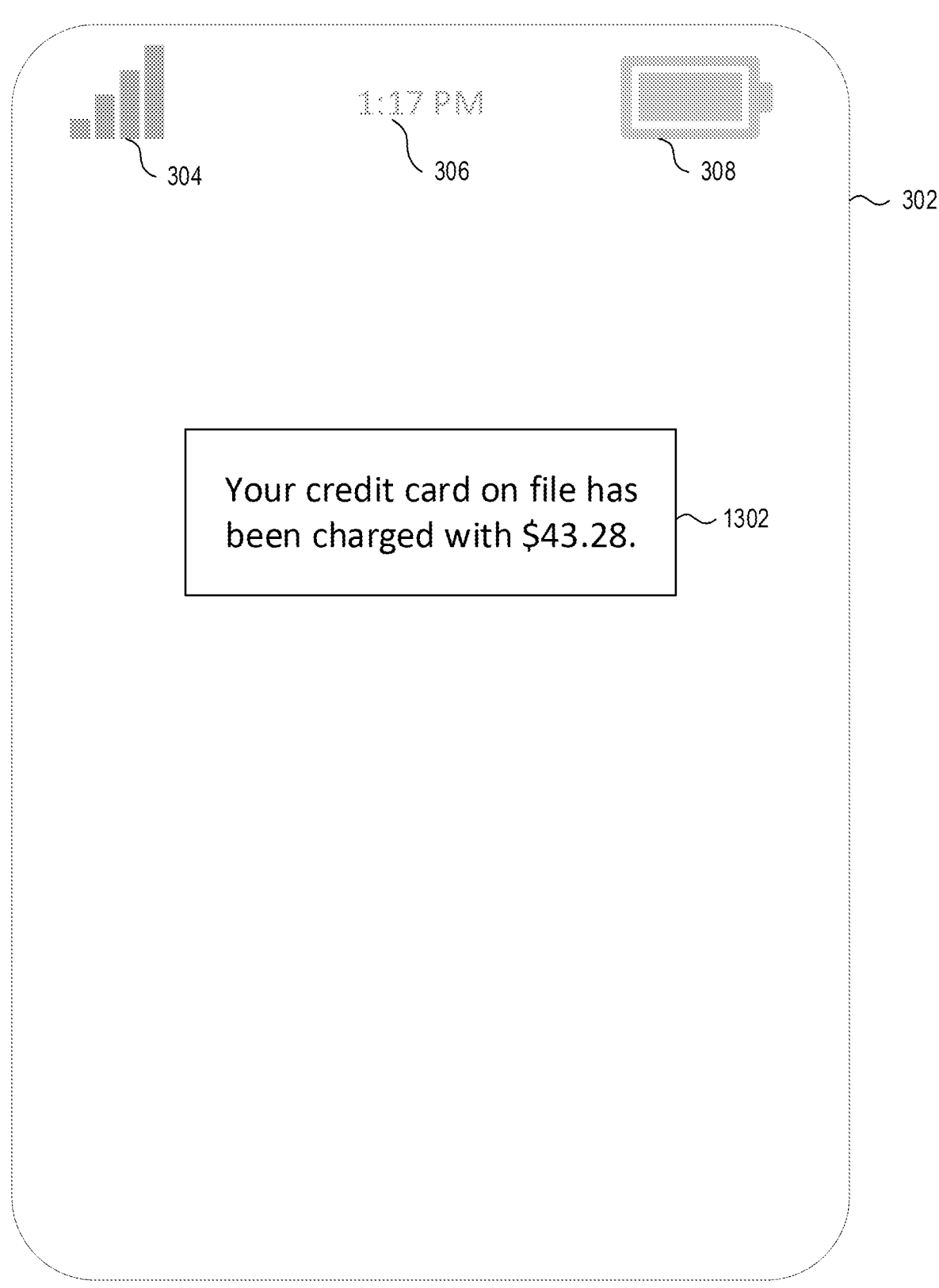

At operation 222, the user device can make a payment for the online language service. For example, as shown in FIG. 13, user device 302 can make a payment for the online language service. In some embodiments, when the user signs up for their account associated with requesting online language services, the user may be required to enter credit card information. The payment can be charged to the credit card on file and a notification as shown in text box 1302 can be displayed on user device 302. In some embodiments, the user can receive a receipt in the email at the email address associated with the account. In some embodiments, if there is not a credit card on file, a bill can be sent to the user's email address or physical address, and the user can pay the bill by mailing a check, by calling a billing center, or by other electronic payment methods.

Figure 14:
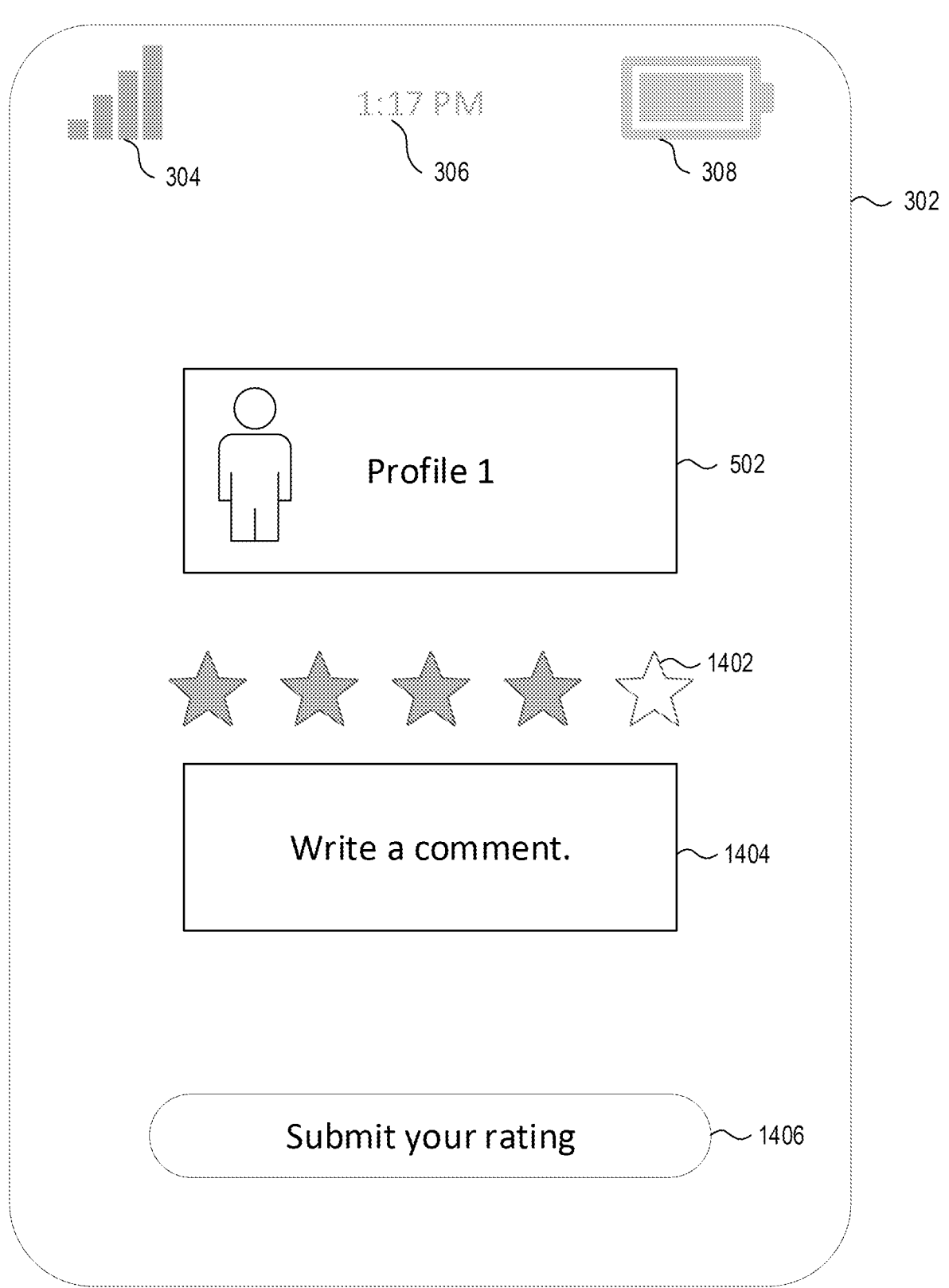

At operation 224, the user device can submit a rating of the selected language service provider. For example, as shown in FIG. 14, user device 302 can submit a rating of the selected language service provider as shown in profile 502. The user can rate the selected language service provider based on the traits of the service provider, such as the professionalism and the politeness of the service provider. The user can rate the selected language service provider based on the quality of the service received, such as the helpfulness of the service received and whether the proficiency level of the service provider is consistent with what the service provider alleges. The user can rate the selected language service provider using a five-star rating system 1402. A lower star indicates a worse service, and a higher star indicates a better service. The user can write a comment in text box 1404 to describe the user's experience with the service received and the user's evaluation of the service provider. The user can submit the rating with button 1406. In some embodiments, a third party (e.g., a government official, a street vendor, etc.) other than the user and the provider to the language service can rate the provider. The user and/or the provider can send a link to a phone number or an email address associated with the third party. The third party can follow the link to rate the provider based on the language service that the third party was a participant of. The third party rating of the provider can be similar to the user rating of the provider. The language service provider will have a rating based on an average of all the ratings they receive. The rating and comments for the automatic tool powered by artificial intelligence can help the developers identify the areas of improvement for the automatic tool. In some embodiments, if a language service provider is consistently rated below a threshold star, such as a one star or two stars, they may be disqualified from providing language services and they may be removed from the database of the language service provider candidates. After operation 224 is completed, the online language service requested is completed. In some embodiments, the user can request a transcript of the service for a fee. The fee for the transcript can be a fixed fee or can be based on the number of words in the transcript. In some embodiments, the user can be taken to a dashboard showing the history of the user's requests, the language service providers that the user has worked with, the total number of connections, the total time of connections, the total cost of connections, etc. Even though requesting a language service is illustrated as requesting a real-time interpretation service, translation services can also be requested. In some embodiments, the user can upload a document from a computing or mobile device or from a cloud server and request translation services on the document.

FIG. 15 is a flowchart of a method 1500 for providing an online language service in accordance with one or more embodiments of the present technology. In some embodiments, before a service provider can provide online language services, the service provider may be required to download an application associated with providing online language services from an application store to a service provider device and agree to the terms of agreement of using the application. The application store can have a description of the application. The service provider may need to agree to a confidentiality agreement. In some embodiments, the online language service can be integrated into a commercial video conferencing application as a plug-in or a module. The service provider may be required to sign up for an account associated with providing online language services. The service provider may sign up for the account with an email address. The service provider may sign up for the account with a phone number and may be required to enter a verification code sent to the mobile device associated with the phone number. The service provider may sign up for the account with a social networking account associated with the service provider. The service provider may need to enter information such as their name, gender, address, date of birth, profile picture, contact information, etc. Once the service provider signs up for the account, the service provider may be taken to a training page or an orientation page to learn how to use the application. Method 1500 can be implemented on service provider devices 104a, 104b, and 104c. The operations of method 1500 will be explained with reference to FIGS. 16-26.

Figure 16:
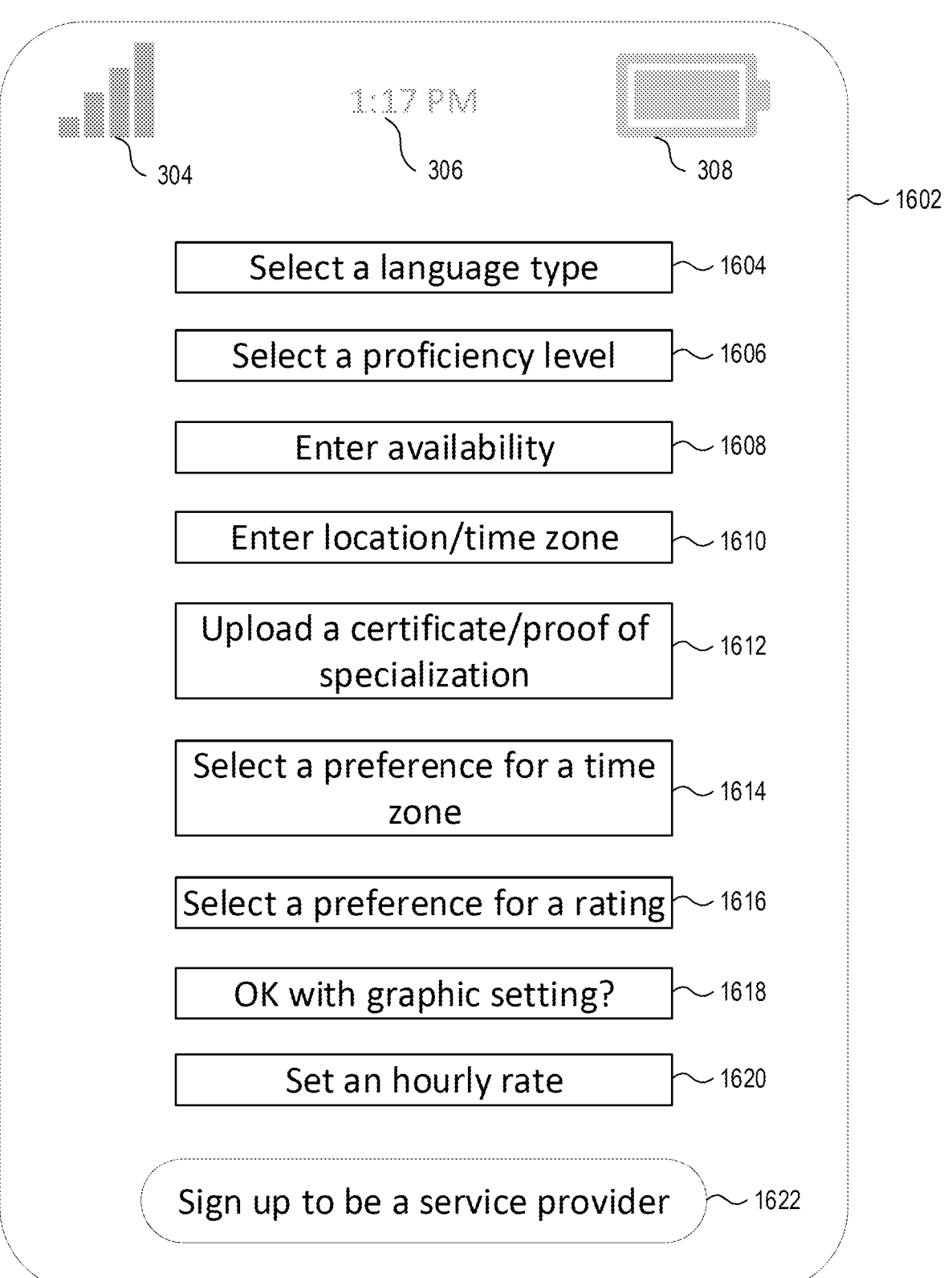
FIGS. 16-26 illustrate the method for providing the online language service as shown in FIG. 15 in accordance with one or more embodiments of the present technology.

At operation 1502, the service provider device can send an input of an online language service that an online language service provider can provide. For example, as shown in FIG. 16, service provider device 1602 can send an input of an online language service that an online language service provider can provide. Service provider device 1602 can be one of service provider devices 104a, 104b, and 104c. The language service provider can select a language type that the service provider can speak, such as English, Spanish, French, Chinese, etc., from drop down menu 1604. The language service provider can select a proficiency level for the language type that the service provider can speak, such as beginner, intermediate, advanced, etc., from drop down menu 1606. The language service provider can select or input an availability of the service provider, such as whenever online, 8 AM to 5 PM on weekdays, 8 PM to 11 PM on weekends, etc., in text box 1608. The selected or entered availability can be a general availability. The language service provider can go online at operation 1506 or go offline at operation 1522. It can be assumed that the language service provider is available when the provider is online even if it is outside the general availability timeframe. The language service provider can select or input a location or a time zone where the service provider is located, such as Norway, California, New York City, Greenwich Mean Time (GMT)-7, etc., in text box 1610. In some embodiments, the application can detect the location and determine the time zone of the service provider if the service provider allows the application to detect the location. The language service provider can upload a certificate, such as an American Translators Association (ATA) certification, etc., or a proof of specialization for the language service that the service provider can provide, such as a Juris Doctor (JD) diploma for a legal specialization or a medical board certification for a medical specialization, etc., using button 1612. Being a certified interpreter is not mandatory to provide online language services. For example, a native Chinese speaker who speaks fluent English can be a qualified interpreter between English and Chinese. However, some situation may require a certified interpreter, such as in legal settings or governmental affairs. Having a JD or being a board-certified physician is not mandatory to provide online language services in the legal or medical specialization. The service provider can provide other proof such as extended work experience in legal or medical settings. Proofs of specialization in other fields include a certificate of Certified Public Accountants (CPA) for finance settings and a license of a real estate broker for real estate settings. In some embodiments, the language service provider can use drop down menu 1614 to select a preference for a time zone where the language service requesters are located, such as any time zone, in the same time zone as the service provider, within three hours of the time zone of the service provider, etc. The language service provider can use drop down menu 1616 to select a preference for a rating of the language service requesters, such as five stars only, at least four stars, etc. The language service provider can answer a question whether they are comfortable with assisting police officers or EMTs in violent or graphic settings, such as where there are body parts, blood, etc., from drop down menu 1618. If they answer no, they will not be assigned to requests by police officers, EMTs, or victims at a violent or graphic setting. In some embodiments, the service provider can set their own hourly rate by selecting or inputting an hourly rate in text box 1620. In some embodiments, some input entries can be mandatory, such as the language type and the proficiency level, while other input entries can be optional. Once all necessary input entries are selected or entered, the language service provider can sign up to be a service provider using button 1622.

Figure 17:
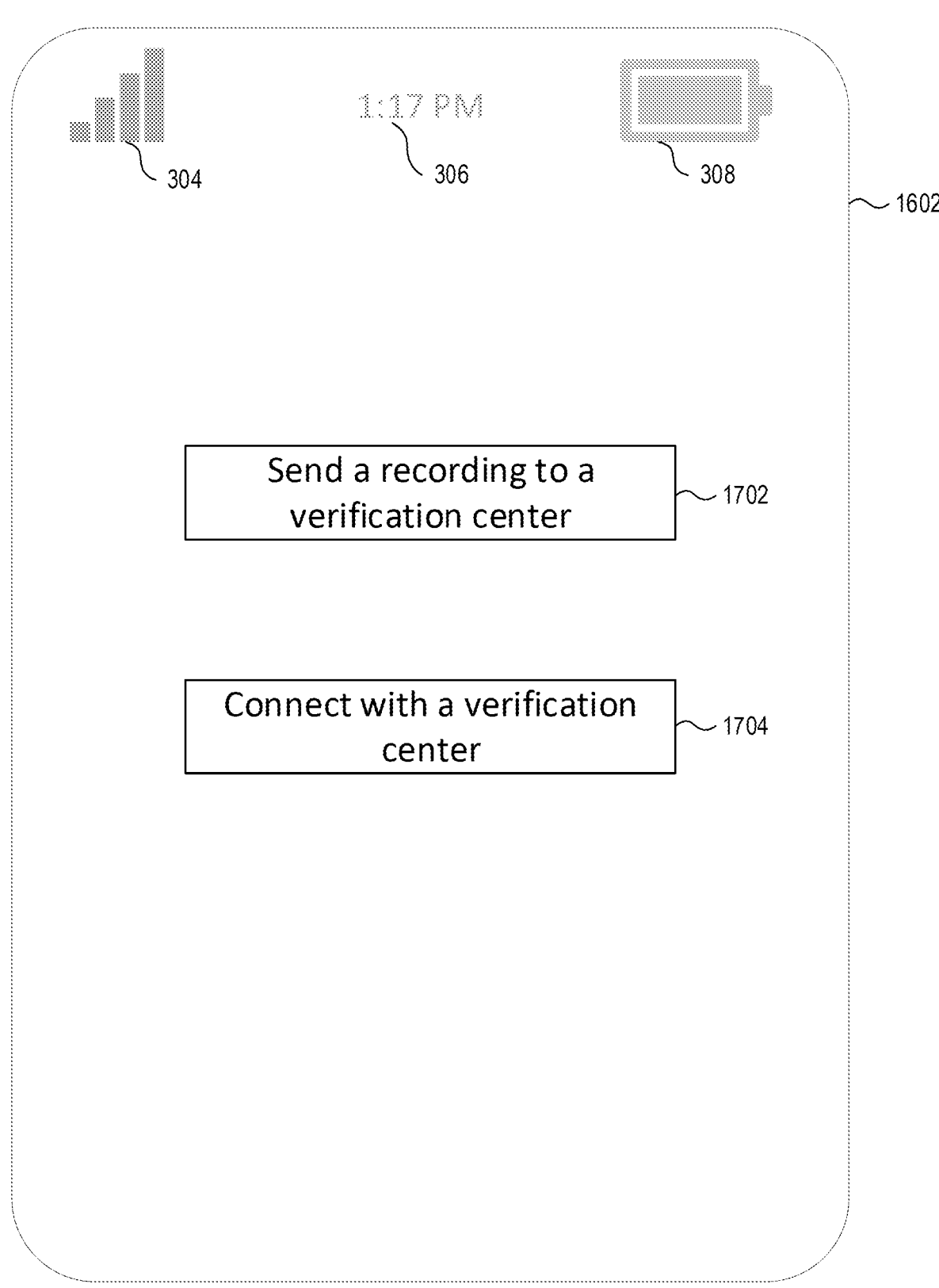

At operation 1504, the service provider device can send a recording to or initiate a connection with a verification center. For example, as shown in FIG. 17, service provider device 1602 can send a recording to or initiate a connection with a verification center. The verification center can verify whether the language service provider can provide the language type in the proficiency level as alleged in their input entries. The verification can be done by humans. In some embodiments, the verification can be done by a tool or a software powered by artificial intelligence. The language service provider can send an audio or video recording to the verification center using button 1702. Button 1702 can lead the language service provider to a page where the service provider can record a translation of a sample paragraph. In some embodiments, the language service provider can record a translation of a paragraph of the provider's own choosing. In some embodiments, the language service provider can record the translation ahead of time and simply upload the prepared recording. The language service provider can connect with the verification center using button 1704 in an audio or video conference. During the audio or video conference, the service provider can be asked to translate sample paragraphs, and/or answer additional questions. In some embodiments, the verification process can include a grammar test for the language service providers. In some embodiments, the verification center can verify the validity of the certificates and the proofs of specialization uploaded by the language service provider. The verification center can verify the validity of the certificates and the proofs of specialization by checking against public records. In some embodiments, after the verification center verifies the necessary credentials and language proficiencies of the language service provider, the profile of the language service provider can be shown as "verified" to language service requesters. In some embodiments, the verification center can do a background check for the language service provider, such as the provider's education, work experience, criminal background, credit rating, etc. After the verification center verifies the necessary input entries, the language service provider can be officially added to the database of the language service provider candidates.

Figure 18:
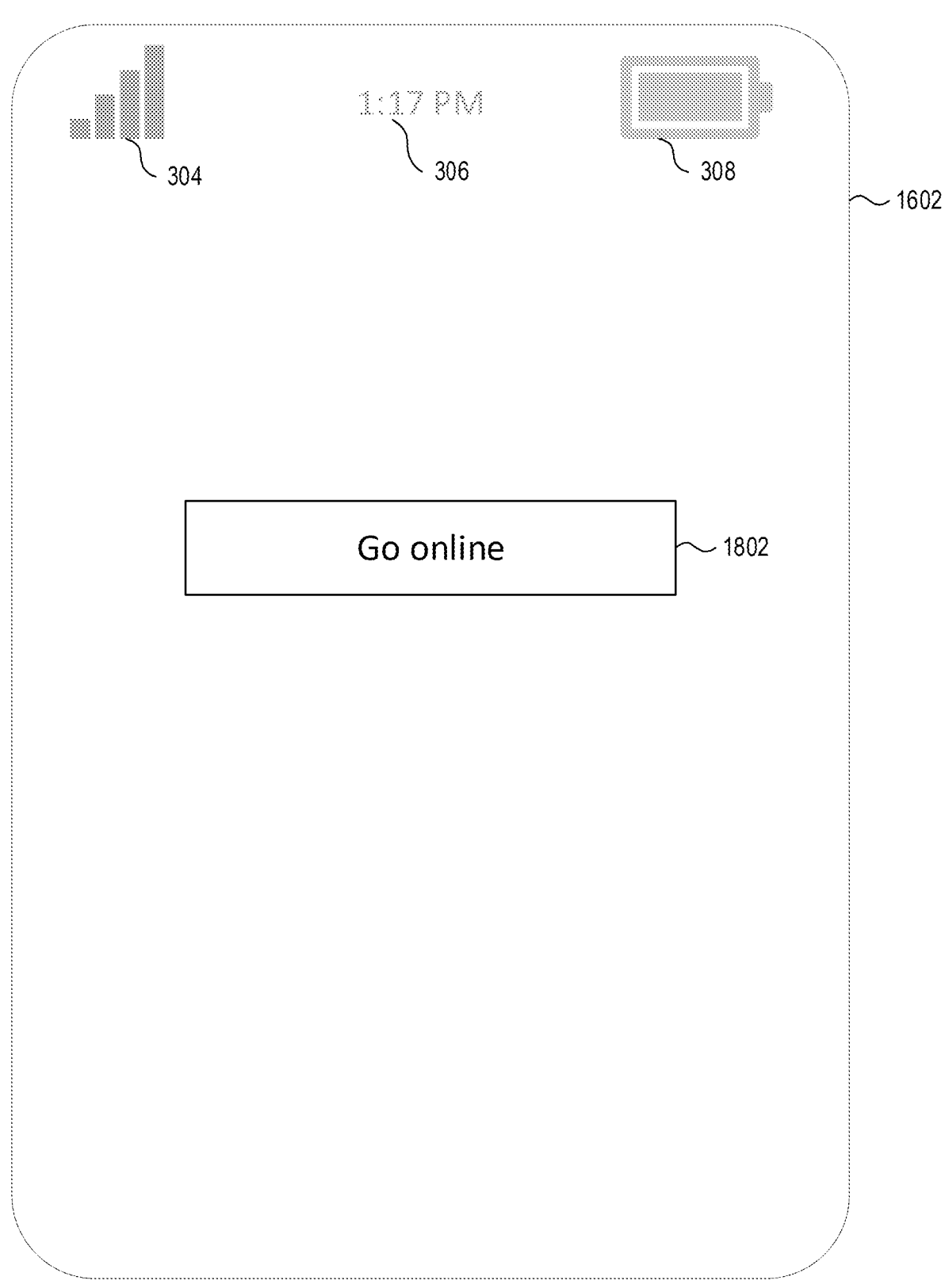

At operation 1506, the service provider device can be set to an online status. For example, as shown in FIG. 18, service provider device 1602 can be set to an online status. The service provider can manually set service provider device 1602 to an online status using button 1802. In some embodiments, service provider device 1602 can be set to an online status automatically if activities, such as opening the application associated with providing online language services, making selections in the application, etc., are detected. If service provider device 1602 is set to an online status, it indicates that the language service provider is available to provide online language services, even if it is outside their general availability timeframe. In some embodiments, the language service provider can be assumed to be available in their general availability timeframe even if the online status is not set.

Figure 19:
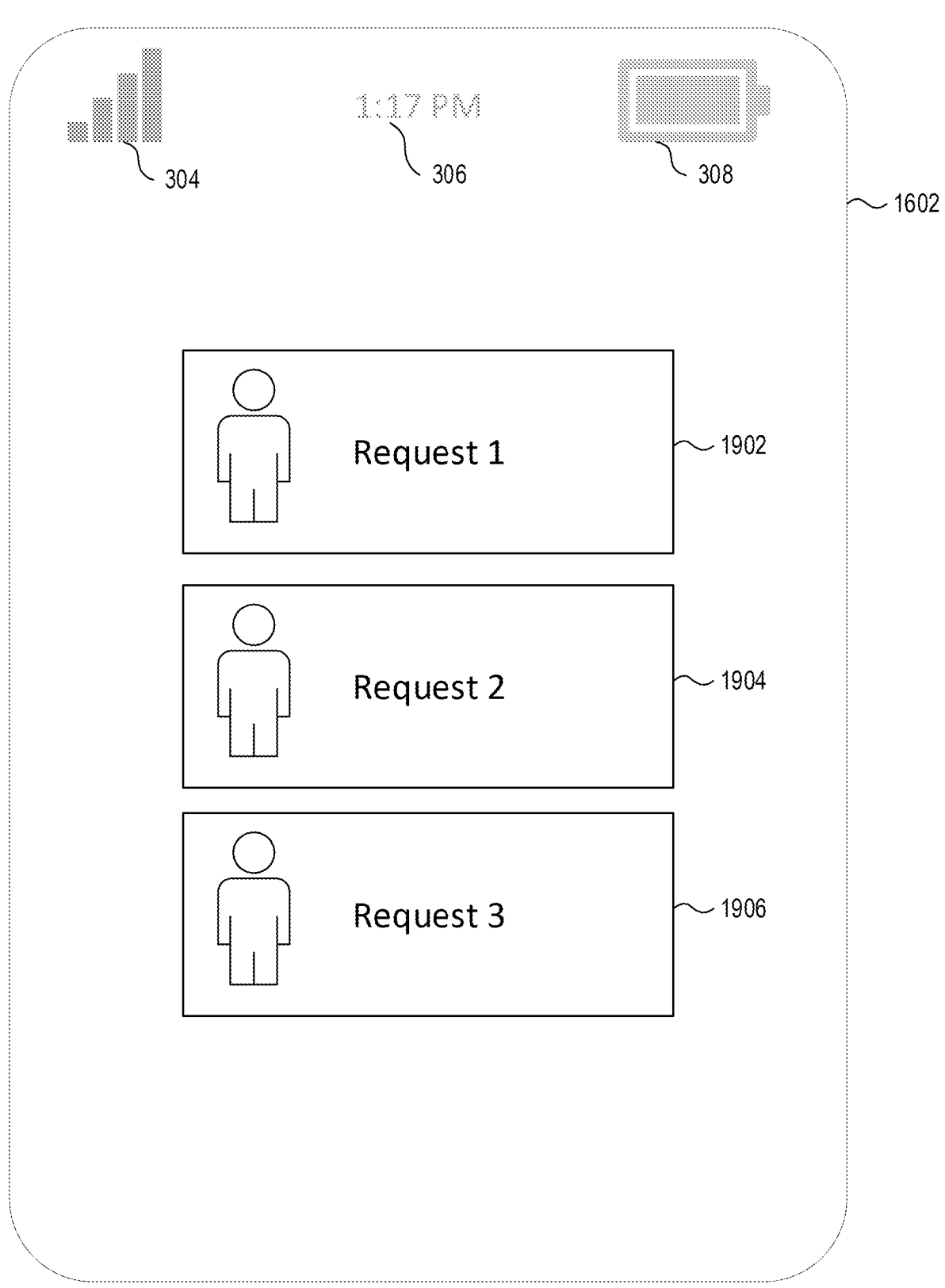

At operation 1508, the service provider device can receive information on a list of connection requests. For example, as shown in FIG. 19, service provider device 1602 can receive information on a list of connection requests. The information on the list of connection requests can be displayed as request 1902, request 1904, and request 1906. In some embodiments, request 1902, request 1904, and request 1906 can be associated with user devices 102*a*, 102*b*, and 102*c*, respectively. In some embodiments, more or fewer requests can be provided. For example, in some embodiments, one request can be displayed at a time. In some embodiments, if the service provider dismisses some or all of the connection requests provided, new connection requests can be provided. Each connection request can include basic information on the language service requester, such as their name, gender, location such as city, country, or time zone, age, profile picture, rating, etc. Each connection request can include information on the language type requested. This is important where the language service provider can offer language services in multiple language types. The service provider needs to know what language is being requested. Each connection request can include information on the proficiency level requested, the start time, the end time, the specialization requested, etc. In some embodiments, each connection request can include information on a preview of an estimated service fee that the language service provider can receive for completing the connection request. In some embodiments, the connection requests can be presented on a map showing the approximate locations, such as cities, states, and countries, of the language service requesters instead of on a list.

Figure 20:
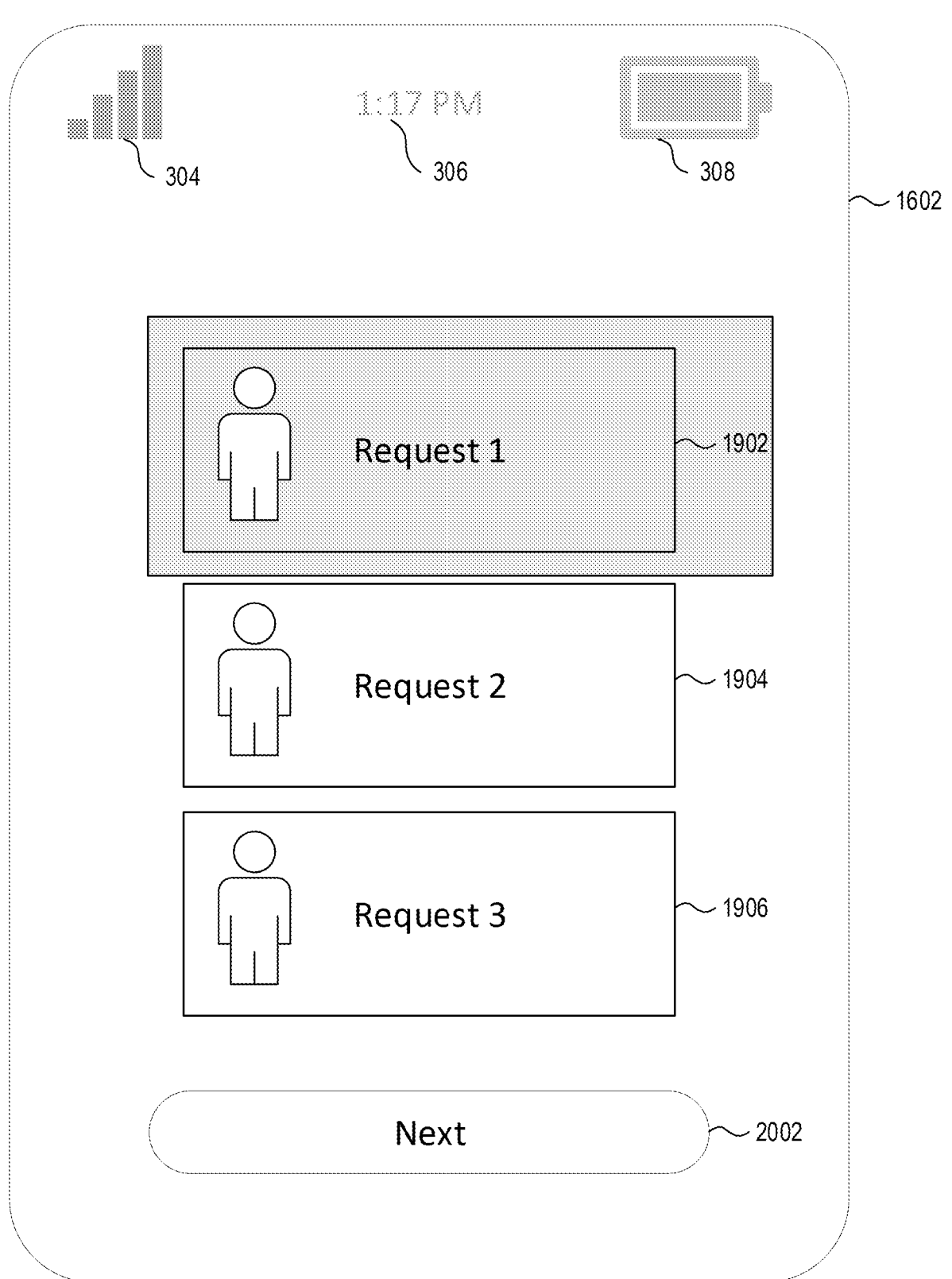

At operation 1510, the service provider can select a connection request on the service provider device. For example, as shown in FIG. 20, the service provider can select a connection request on service provider device 1602. The service provider may select a connection request based on the service fee the service provider can receive for completing the connection request. For example, some service providers may want to accept the connection request that they can receive the most service fee for. Some service providers may want to accept the connection request that requires a specialization because those connection requests can pay more service fees. The service provider may select a connection request based on the time zone where the language service requester is located. For example, some service providers may prefer the language service requesters to be in the same time zone as them. The service provider may select a connection request based on the provider's own availability. For example, the service provider may be generally available from 8 AM to 5 PM on weekdays, and the provider may receive a connection request that ends at 5 PM on a Friday. However, that specific Friday, the service provider may have a doctor appointment from 4 PM to 5 PM. The service provider may then select a connection request that ends at 4 PM instead. The service provider may select a connection request based on the rating of the language service requester. For example, some service providers may only want language service requesters with at least a four-star rating because they do not want to deal with rude customers. Once the service provider selects a connection request, the connection request can be in a different shade. For example, request 1902 is selected in FIG. 20, and it is in a grey shade. The service provider can then use button 2002 to move to operation 1512.

Figure 21:
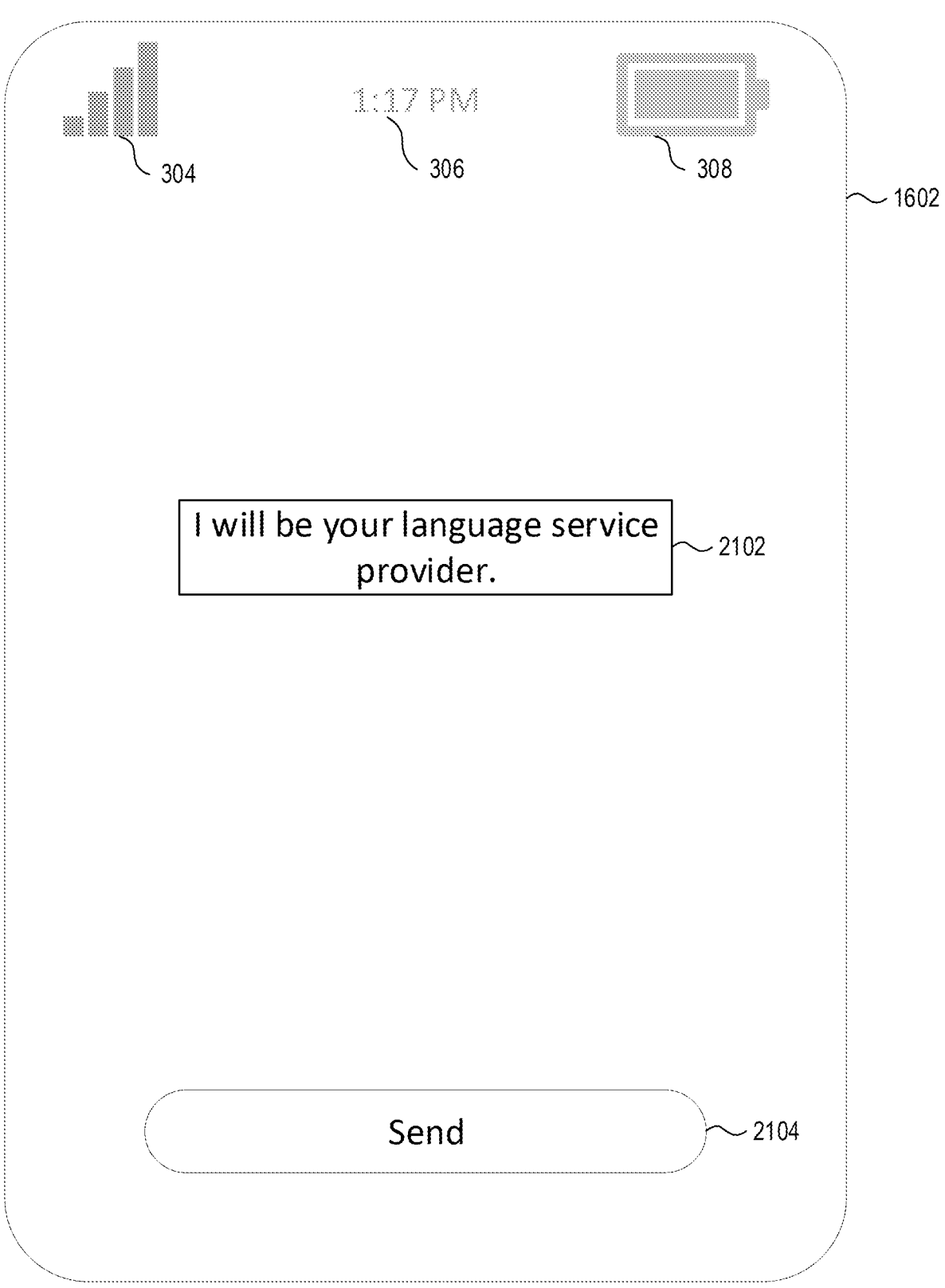

At operation 1512, the service provider device can send a confirmation to a language service requester associated with the selected connection request that the service provider has accepted the connection request. For example, as shown in FIG. 21, service provider device 1602 can send a confirmation in text box 2102 to a language service requester associated with the selected connection request that the service provider has accepted the connection request to be the designated language service provider. The service provider can use button 2104 to send the confirmation. In some embodiments, the service provider can send a confirmation to a language service requester associated with another connection request that the service provider will be the backup language service provider. If the designated language service provider for the other connection request cannot start and/or complete the connection request, the backup language service provider can step up to help the language service requester. In some embodiments, the service provider can send a rejection message to a language service requester associated with another connection request that the service provider has declined the connection request.

Figure 22:
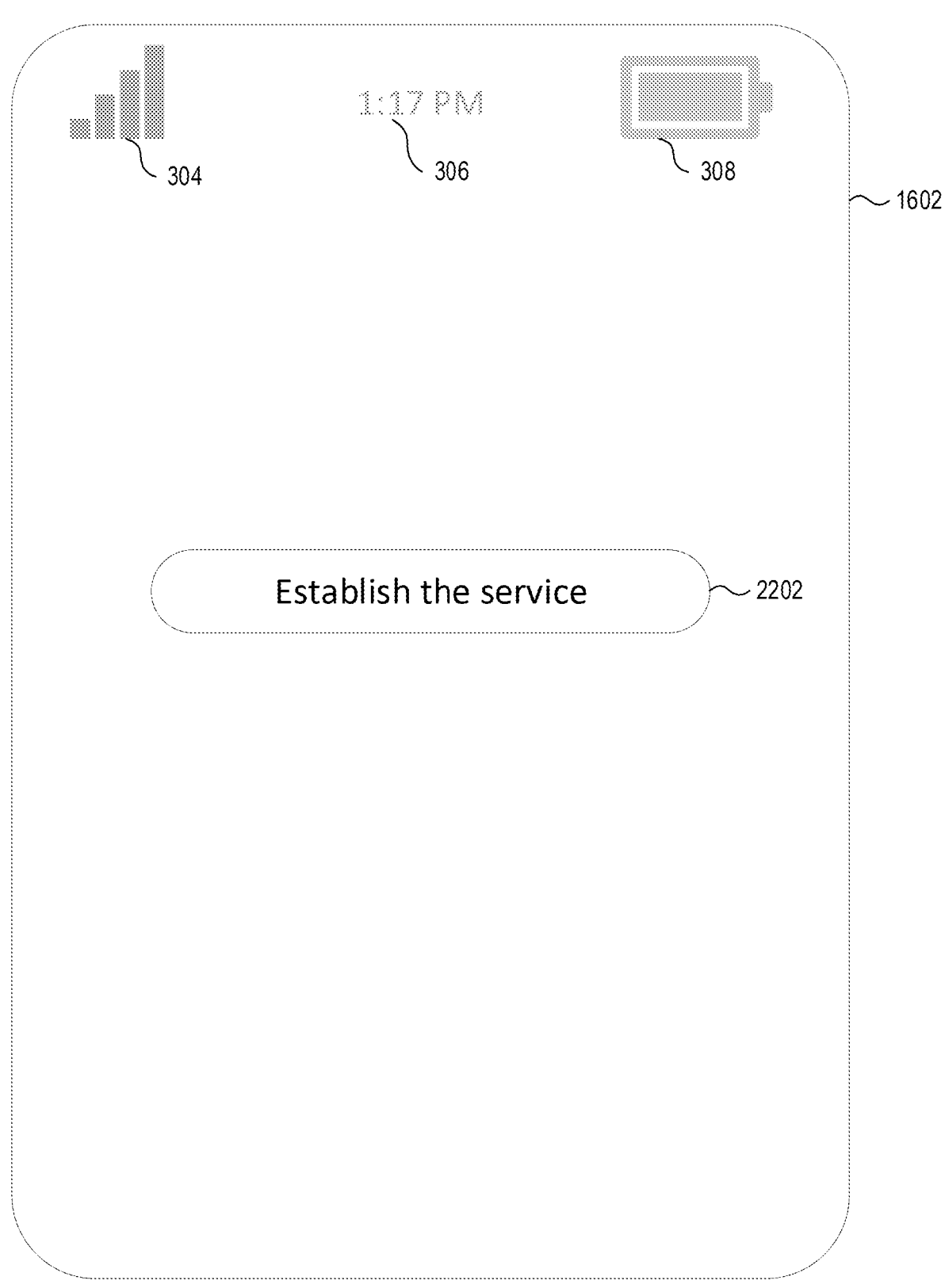

At operation 1514, the service provider device can establish a connection with the language service requester at the specified start time. For example, as shown in FIG. 22, service provider device 1602 can establish a connection with the language service requester at the specified start time. In some embodiments, the service provider may simply accept the service call from the language service requester with button 2202. In some embodiments, the service provider can initiate the service call on service provider device 1602 with button 2202. In some embodiments, the connection can be automatically started on service provider device 1602 at the specified start time, such as immediately, in half an hour, at 2 PM on next Wednesday, etc. In some embodiments, the service can start right away if no start time is specified. The connection can be a video connection using the video conferencing capability of service provider device 1602. In some embodiments, the connection can utilize a built-in video conferencing interface of the application associated with providing online language services. In some embodiments, the connection can be automatically directed to and completed by a commercial video conferencing application installed on service provider device 1602. The connection can be an audio connection using the audio capability of service provider device 1602, such as a phone call. In some embodiments, the connection can utilize a built-in audio calling interface of the application associated with providing online language services. In some embodiments, a third party can be added to the connection. For example, if the language service requester is interviewing with an immigration officer, there can be a three-way audio or video conference among the language service requester, the immigration officer, and the language service provider.

Figure 23:
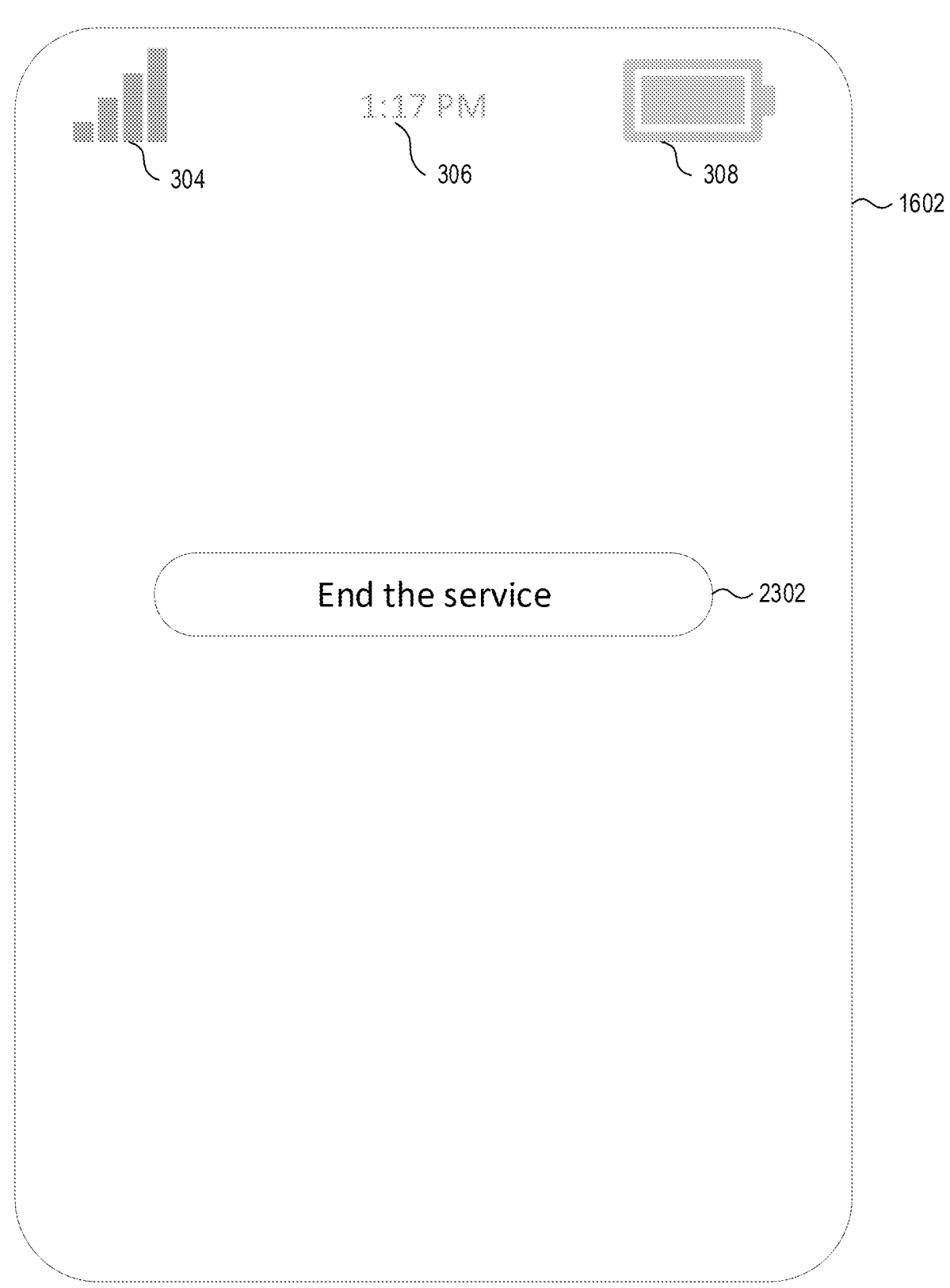

At operation 1516, the service provider device can terminate the connection with the language service requester. For example, as shown in FIG. 23, service provider device 1602 can terminate the connection with the language service requester. In some embodiments, service provider device 1602 can automatically terminate the service at the specified end time. In some embodiments, the service can be terminated as soon as the service is completed if no end time is specified. In some embodiments, the service provider can manually end the service with button 2302. This can allow for situations where the service may be needed for a longer or shorter time than planned. In some embodiments, the language service requester can also end the service on the user device. In some embodiments, the service provider can terminate the service call if the nature of the service is different from what it is intended to be or when the service requester behaves in some undesirable manner to the service provider. For example, if the language service requester starts to harass the service provider, the service provider can terminate the call. The service provider can report any unacceptable conduct such as harassment or other inappropriate behaviors by the language service requester so that such reporting can be evaluated to determine appropriate actions against the language service requester.

Figure 24:
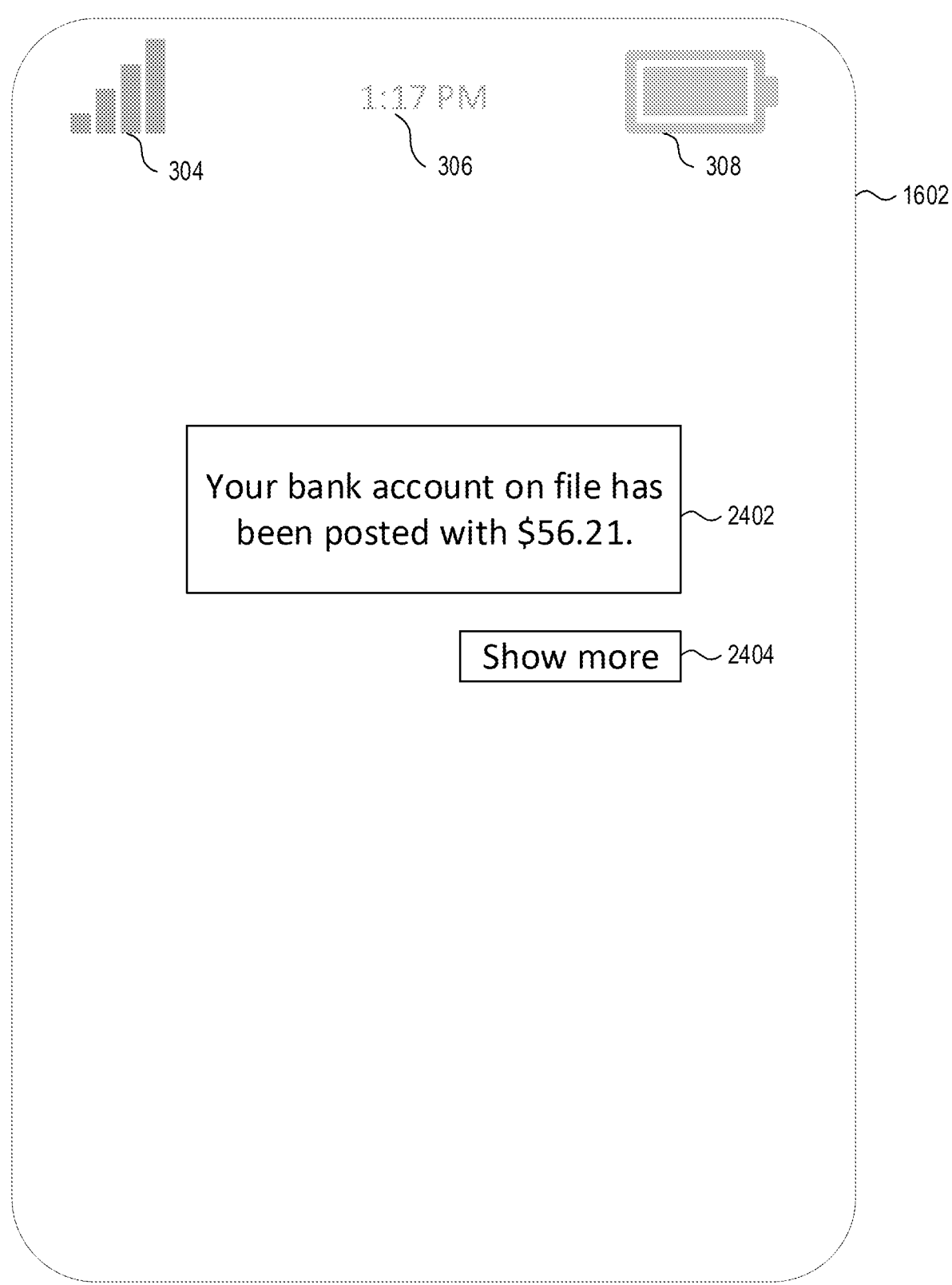

At operation 1518, a notification of a received payment for the online language service can be displayed on the service provider device. For example, as shown in FIG. 24, a notification of a received payment for the online language service can be displayed in text box 2402 on service provider device 1602. The notification of the received payment can be generated by server 106 and sent to service provider device 1602. In some embodiments, the notification of the received payment can be generated by service provider device 1602. The received payment can be based on the adjusted charge paid by the language service requester. For example, the received payment can be a portion of the adjusted charge paid by the language service requester. The received payment can be an amount calculated based on the service provider terms of agreement. In some embodiments, when the service provider signs up for their account associated with providing online language services, the service provider may be required to enter bank account information. The payment can be posted to the bank account on file and a notification as shown in text box 2402 can be displayed on service provider device 1602. In some embodiments, the service provider can receive a payment acknowledgement in the email at the email address associated with the account. In some embodiments, if there is not a bank account on file, a check can be sent to the service provider's physical address, and the service provider can deposit the check. In some embodiments, payments for a number of language services provided can be consolidated into one payment. If the service provider wants to know the breakdown and the explanation of the received payment, they can click on text box 2404 to expand the details of the received payment.

Figure 25:
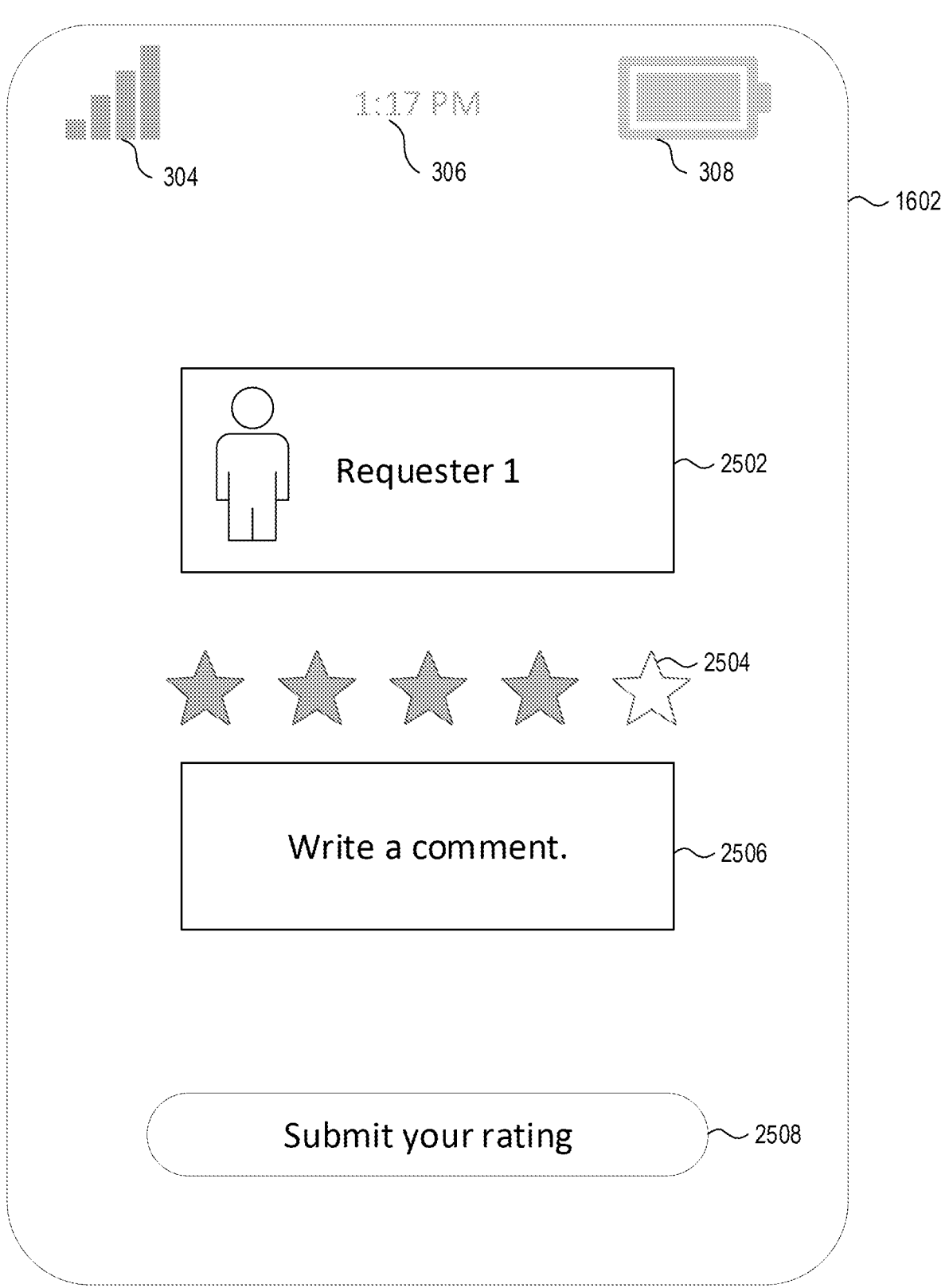

At operation 1520, the service provider device can submit a rating of the language service requester. For example, as shown in FIG. 25, service provider device 1602 can submit a rating of the language service requester as shown in profile 2502. The service provider can rate the language service requester based on the traits of the language service requester, such as the politeness of the language service requester. The service provider can rate the language service requester using a five-star rating system 2504. A lower star indicates a less polite requester, and a higher star indicates a politer requester. The service provider can write a comment in text box 2506 to describe the manners of the requester. The service provider can submit the rating with button 2508. The language service requester will have a rating based on an average of all the ratings they receive. In some embodiments, if a language service requester is consistently rated below a threshold star, such as a one star or two stars, they may be disqualified from requesting language services.

Figure 26:
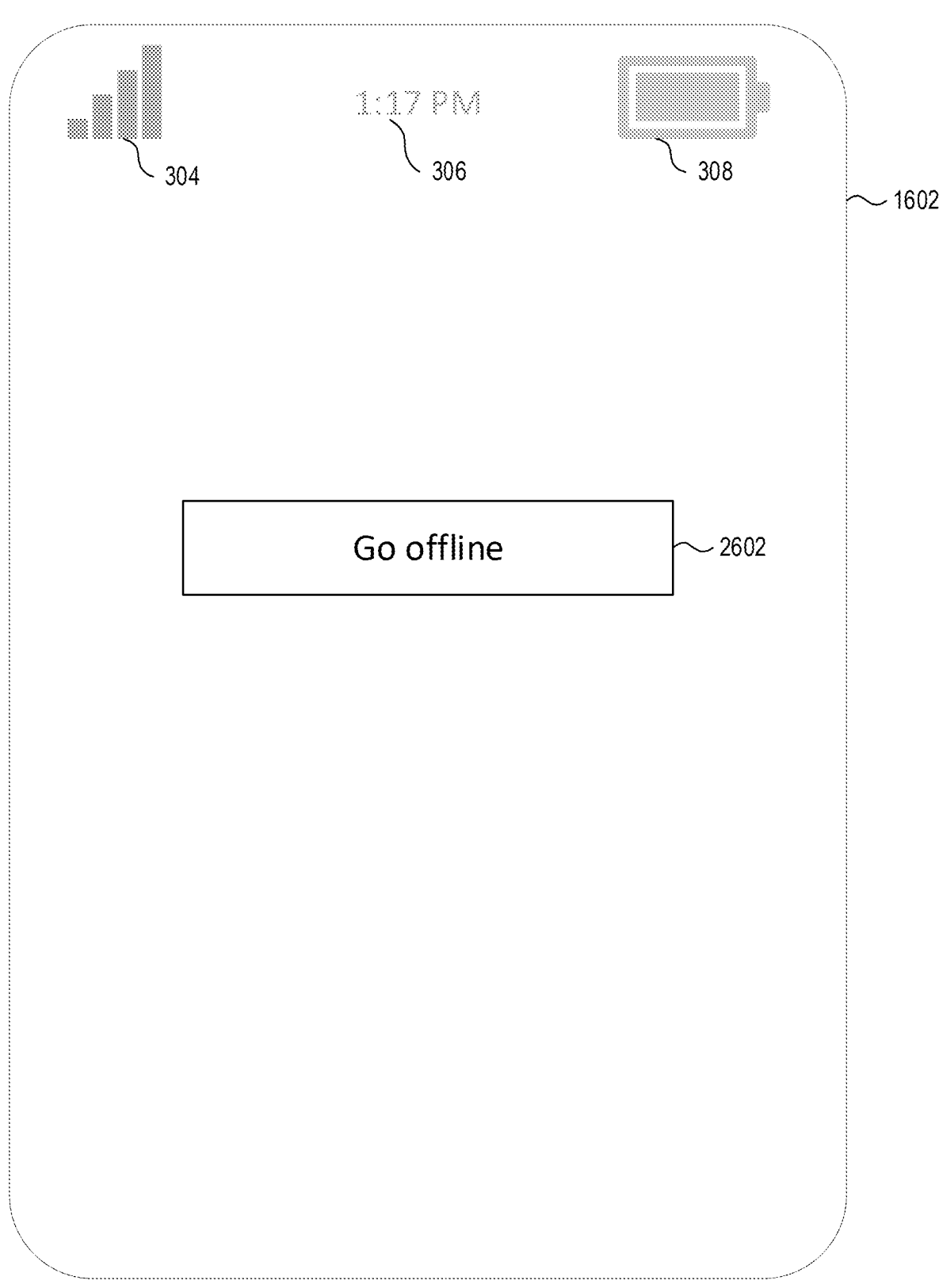

At operation 1522, the service provider device can be set to an offline status. For example, as shown in FIG. 26, service provider device 1602 can be set to an offline status. The service provider can manually set service provider device 1602 to an offline status using button 2602. In some embodiments, service provider device 1602 can be set to an offline status automatically if no activities, such as opening the application associated with providing online language services, making selections in the application, etc., are detected for a certain amount of time, such as 15 minutes. If service provider device 1602 is set to an offline status, it indicates that the language service provider is not available to provide online language services, even if it is within their general availability timeframe. In some embodiments, the language service provider can be assumed to be unavailable to take on new requests during the time when they are in connection with a language service requester. In some embodiments, the service provider can be taken to a dashboard showing the history of the services provided by the service provider, the language service requesters that the service provider has worked with, the total number of connections, the total time of connections, the total payment of connections, etc. Even though providing a language service is illustrated as providing a real-time interpretation service, translation services can also be provided. In some embodiments, the service provider can receive documents from server 106 to translate the documents within a specified time frame.

FIG. 27 is a flowchart of a method 2700 for sorting language service provider candidates in accordance with one or more embodiments of the present technology. Method 2700 can be implemented on computing devices 106*a*, 106*b*, and 106*c*, namely server 106.

At operation 2702, a server can receive a request for an online language service. For example, server 106 can receive a request for an online language service from one of user devices 102*a*, 102*b*, and 102*c* in a wired or wireless communication. The request can include information on a language type, a proficiency level of the language type, a start time, an end time, a specialization, a preferred time zone, a minimum rating requirement, a preference for a service provider who is online, or combinations thereof.

At operation 2704, the server can search in a database of language service provider candidates for a group of candidates who can provide the service in the requested language type. The database of the language service provider candidates can include a relational database, a non-relational database, an object-oriented database, an extensible markup language (XML) database, etc. In some embodiments, the database of the language service provider candidates can be a cloud-based database, an Internet-based database, a web-based database, etc. The search can be based on a keyword search for the requested language type, such as English, Spanish, French, Chinese, etc. The search can be a database query using programs written in a database query language, such as Structured Query Language (SQL). The search can be a database query using programs written in other programming languages, such as C, C++, C#, Objective-C, Java™, JavaScript™, Pascal, COBOL, Delphi, Eiffel, Python™, Scala™, Rust™, Lisp, Visual Basic, .NET, React™, Angular™, View™, or combinations thereof.

At operation 2706, the server can identify a group of candidates who meet the requested proficiency level. The group of candidates who meet the requested proficiency level can be identified from the database of the language service provider candidates. The group of candidates who meet the requested proficiency level can be identified from the group of candidates who speak the requested language type. The identification can be based on a keyword search for the requested proficiency level, such as beginner, intermediate, advanced, etc. The search can be a database query using programs written in a database query language or other programming languages.

At operation 2708, the server can identify a group of candidates who are available at the requested start time. The group of candidates who are available at the requested start time can be identified from the database of the language service provider candidates. The group of candidates who are available at the requested start time can be identified from the group of candidates who speak the requested language type. The identification can be based on a comparison between the requested start time and the availability of the language service provider candidates. For example, if the requested start time is 9 AM on Tuesday, a language service provider who is available from 8 AM to 5 PM on weekdays would qualify. The search can be a database query using programs written in a database query language or other programming languages.

At operation 2710, the server can identify a group of candidates who are available at the requested end time. The group of candidates who are available at the requested end time can be identified from the database of the language service provider candidates. The group of candidates who are available at the requested end time can be identified from the group of candidates who speak the requested language type. The identification can be based on a comparison between the requested end time and the availability of the language service provider candidates. For example, if the requested end time is 10 PM on Saturday, a language service provider who is available from 8 PM to 11 PM on weekends would qualify. The search can be a database query using programs written in a database query language or other programming languages.

At operation 2712, the server can identify a group of candidates who can provide the specialized language service. The group of candidates who can provide the specialized language service can be identified from the database of the language service provider candidates. The group of candidates who can provide the specialized language service can be identified from the group of candidates who speak the requested language type. The identification can be based on a keyword search for the requested specialization, such as legal, medical, etc. The search can be a database query using programs written in a database query language or other programming languages.

At operation 2714, the server can identify a group of candidates who are in the requested time zone. The group of candidates who are in the requested time zone can be identified from the database of the language service provider candidates. The group of candidates who are in the requested time zone can be identified from the group of candidates who speak the requested language type. The identification can be based on a comparison between the requested time zone and the time zone of the language service provider candidates. For example, if the requester's time zone is GMT-7 and the requester prefers the service provider to be in the same time zone, a language service provider who is in GMT-7 would qualify. If the requester's time zone is GMT-9 and the requester prefers the service provider to be within three hours, language service providers who are in GMT-6 to GMT-12 would qualify. In some embodiments, some service providers may not want to provide service to requesters located in inconvenient time zones. For example, some service providers may not want to stay up at midnight to provide service even though a service requester is fine with working with service providers in a time zone that is twelve hours away. These service providers can be filtered from the group of candidates based on service provider preferences. The search can be a database query using programs written in a database query language or other programming languages.

At operation 2716, the server can identify a group of candidates who meet the minimum rating requirement. The group of candidates who meet the minimum rating requirement can be identified from the database of the language service provider candidates. The group of candidates who meet the minimum rating requirement can be identified from the group of candidates who speak the requested language type. The identification can be based on a comparison between the minimum rating requirement and the ratings of the language service provider candidates. For example, if the minimum rating requirement is four stars, a language service provider who has a rating of four point two stars would qualify. The search can be a database query using programs written in a database query language or other programming languages. The database can dynamically update the ratings of the language service provider candidates as new ratings are received.

At operation 2718, the server can identify a group of candidates who are online. The group of candidates who are online can be identified from the database of the language service provider candidates. The group of candidates who are online can be identified from the group of candidates who speak the requested language type. Server 106 can register a language service provider candidate to be online after receiving or detecting an online status of a service provider device associated with the language service provider. The identification can be based on a search for the register of online statuses. The search can be a database query using programs written in a database query language or other programming languages. Server 106 can dynamically update the online and offline statuses of the language service provider candidates as they go online and offline.

At operation 2720, the server can send information on a list of profiles of language service provider candidates who can provide the requested language service. The list of language service provider candidates who can provide the requested language service can be all the candidates who speak the requested language type. The list of language service provider candidates who can provide the requested language service can be all or some of the candidates who meet the requested proficiency level, who are available at the requested start time, who are available at the requested end time, who can provide the specialized language service, who are in the requested time zone, who meet the minimum rating requirement, and who are online. In some embodiments, the list of language service provider candidates who can provide the requested language service can be language service provider candidates who meet all the requirements. In some embodiments, if the list of language service provider candidates who can provide the requested language service is too long, server 106 may impose more requirements to reduce the size of the list. In some embodiments, if the list of language service provider candidates who can provide the requested language service is too short, server 106 may impose less requirements to increase the size of the list. The profiles of language service provider candidates sent to user devices 102a, 102b, and 102c can be generated based on the information on the language service provider candidates.

In some embodiments, the translation of documents, such as legal documents, can be done by an automatic tool powered by artificial intelligence first. Human translators can review the translation done by the artificial intelligence and make changes if needed. In some embodiments, service requesters can request interpretation services provided by artificial intelligence but reviewed by human language service providers. The interpretation of the conversations is first done by an automatic tool powered by artificial intelligence. Human language service providers can review the interpretation done by the artificial intelligence and make changes if needed.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses various apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, machine-readable script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include various forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that various illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for enabling a user device to interact with a user to receive an real-time interpretation service from a language service provider, wherein the user device includes a computing device or a mobile communication device such as a smartphone, the method comprising:

detecting, by the user device, an audio input comprising a live conversation between the user and a converser in a language type,
    wherein the user and the converser are in person and the language service provider is remote, and wherein the user and the converser are conversing in the language type and an additional language type different from the language type;

detecting, by the user device, a video input comprising the live conversation;

making a first determination, by the user device, of the language type based on the live conversation;

making a second determination, by the user device based on the live conversation, that a proficiency level of the user in the language type is below a minimum proficiency level needed to communicate effectively,
    wherein the second determination is based on (a) at least one of either the user or the converser using faulty grammar in the language type, either the user or the converser dominating the live conversation, or either the user or the converser frequently using indicators of communication difficulty, and (b) at least one of hand gestures made by the user or the converser, nodding by the user or the converser, or head shaking by the user or the converser, each indicating communication difficulty;

automatically sending, from the user device based on the first determination and the second determination, a request of the user for the real-time interpretation service, the request including information comprising:
  the language type of the real-time interpretation service designated as a selected language type by the user;
  the proficiency level of the selected language type designated as a selected proficiency level by the user; and
  a start time and an end time of the real-time interpretation service designated as a specified start time and a specified end time, respectively, by the user, wherein the start time is specified as immediately;

receiving, at the user device, provider information on a plurality of language service provider candidates who are available to provide the real-time interpretation service of the selected language type, and of the selected proficiency level, and between the specified start time and the specified end time;

selecting, at the user device, a language service provider candidate based on profiles of the plurality of language service provider candidates from the provider information on the plurality of language service provider candidates, thereby designating a selected language service provider candidate;

generating, at the user device and to the user, a preview of a charge for the real-time interpretation service based on the selected language type and the proficiency level of the selected language service provider candidate, and a time interval between the specified start time and the specified end time;

sending, from the user device, a connection request to connect remotely with the selected language service provider candidate;

receiving, at the user device, a notification that the selected language service provider candidate has accepted the connection request as a selected language service provider;

immediately initiating, at the user device, a connection with the selected language service provider to begin the real-time interpretation service provided remotely by the selected language service provider; and terminating, at the user device, the connection with the selected language service provider when the real-time interpretation service is completed or otherwise terminated.

2. The method of claim 1, wherein the request further comprises information regarding a specialization of the real-time interpretation service selected by the user, and wherein the specialization comprises a legal specialization or a medical specialization.

3. The method of claim 1, wherein the provider information on the plurality of language service provider candidates comprises information on an artificial intelligence (AI)-based real-time interpretation service.

4. The method of claim 1, wherein the provider information on the plurality of language service provider candidates comprises an indication that the plurality of language service provider candidates are online.

5. The method of claim 1, wherein the provider information on the plurality of language service provider candidates comprises location information of the plurality of language service provider candidates, and an indication of whether the plurality of language service provider candidates are in a same time zone with the user or in different time zones.

6. The method of claim 1, wherein the provider information on the plurality of language service provider candidates comprises a rating of each language service provider candidate of the plurality of language service provider candidates, and wherein selecting the language service provider candidate is based on the rating.

7. The method of claim 1, wherein generating the preview of the charge for the real-time interpretation service is further based on a total number of available language service provider candidates and a demand for the real-time interpretation service at the specified start time.

8. The method of claim 1, further comprising:

generating, at the user device, a preview of an adjusted charge based on a duration of an actual connection with the selected language service provider; and making, from the user device, a payment in an amount of the adjusted charge.

9. The method of claim 1, further comprising submitting, from the user device, a rating of the selected language service provider based on a quality of the real-time interpretation service received.

10. A method for enabling a service provider device for an online language service provider to provide a real-time interpretation service, wherein the service provider device includes a computing device or a mobile communication device such as a smartphone, the method comprising:

sending, from the service provider device, an input of the real-time interpretation service from the online language service provider, the input including information comprising:

a language type of the real-time interpretation service that the online language service provider can provide;

a proficiency level of the language type of the online language service provider; and an availability during which the online language service provider can provide the real-time interpretation service;

receiving, at the service provider device, requestor information on a plurality of connection requests, wherein the requestor information on each connection request comprises a start time, an end time, and a preview of a service fee payable to the online language service provider, wherein the start time is specified as immediately, and wherein the preview of the service fee is based on the language type, the proficiency level of the online language service provider, and a time interval between the start time and the end time;

selecting, at the service provider device and based on the requestor information on the plurality of connection requests, a connection request, thereby designating a selected connection request, wherein the selected connection request was automatically transmitted by a service requester device, associated with a language service requester, upon (a) detecting an audio input comprising a live conversation between the language service requester and a converser in the language type, (b) detecting a video input comprising the live conversation, (c) analyzing the video input, (d) making a first determination, based on the live conversation, of the language type, and (e) making a second determination, based on the live conversation that a proficiency level of the language service requester in the language type is below a minimum proficiency level needed to communicate effectively, wherein the second determination is based on (a) at least one of either the language service requester or the converser using faulty grammar in the language type, either the language service requester or the converser dominating the live conversation, or either the language service requester or the converser frequently using indicators of communication difficulty, and (b) at least one of hand gestures made by the language service requester or the converser, nodding by the language service requester or the converser, or head shaking by the language service requester or the converser, each indicating communication difficulty;

sending, from the service provider device, a confirmation to the language service requester associated with the selected connection request that the online language service provider has accepted the connection request as a confirmed language service provider;

immediately establishing, at the service provider device, a connection with the language service requester to begin the real-time interpretation service, wherein a third party is added to the connection such that there is a three-way audio or video conference among the language service requester, the converser, and the confirmed language service provider, and wherein the language service requester and the converser are in person and the confirmed language service provider is remote; and terminating, at the service provider device, the connection with the language service requester when the real-time interpretation service is completed or otherwise terminated.

11. The method of claim 10, further comprising sending, from the service provider device, an audio recording or a video recording of the online language service provider speaking in the language type to a verification center or initiating, at the service provider device, a second connection with the verification center such that the verification center can verify the language type and the proficiency level of the real-time interpretation service that the online language service provider can provide.

12. The method of claim 10, wherein the input further includes information comprising a proof of specialization of the online language service provider, which is verified by a verification center, indicating that the online language service provider can provide a specialized real-time interpretation service including a legal specialization or a medical specialization.

13. The method of claim 10, further comprising:

setting the service provider device to an online status when the online language service provider is active on the service provider device; and setting the service provider device to an offline status when the online language service provider is inactive on the service provider device, wherein receiving the information on the plurality of connection requests is based on the service provider device being set to the online status.

14. The method of claim 10, further comprising:

selecting, at the service provider device and based on the requestor information on the plurality of connection requests, a second connection request from a second language service requester; and sending, from the service provider device, a confirmation to the second language service requester associated with the second connection request that the online language service provider has accepted the second connection request as a backup language service provider.

15. A method for sorting language service provider candidates, comprising:

receiving, by one or more computing devices in a communication network, a request for a real-time interpretation service from a user device, the request including information comprising a language type, a proficiency level requirement, a start time, and an end time, wherein the start time is specified as immediately, wherein the request was automatically transmitted by the user device, associated with a user, upon (a) detecting an audio input comprising a live conversation between the user and a converser in the language type, (b) detecting a video input comprising the live conversation, (c) analyzing the video input, (d) making a first determination, based on the live conversation, of the language type, and (e) making a second determination, based on the live conversation that a proficiency level of the user in the language type is below a minimum proficiency level needed to communicate effectively, wherein the second determination is based on (a) at least one of either the user or the converser using faulty grammar in the language type, either the user or the converser dominating the live conversation, or either the user or the converser frequently using indicators of communication difficulty, and (b) at least one of hand gestures made by the user or the converser, nodding by the user or the converser, or head shaking by the user or the converser, each indicating communication difficulty;

searching, in response to the request, in a database of the language service provider candidates stored on the one or more computing devices, for a first group of language service provider candidates, whose database entries indicate that each candidate in the first group is capable of providing language service in the language type;

identifying, from the first group of language service provider candidates, a second group of language service provider candidates, whose database entries indicate that each candidate in the second group meets the proficiency level requirement;

identifying, from the first group of language service provider candidates, a third group of language service provider candidates, whose database entries indicate that each candidate in the third group is indicated to be available at the start time;

identifying, from the first group of language service provider candidates, a fourth group of language service provider candidates, whose database entries indicate that each candidate in the fourth group is indicated to be available at the end time; and sending, in response to the request for the real-time interpretation service, information comprising a list of profiles of the language service provider candidates that are in all of the second, third, and fourth groups of the language service provider candidates, wherein each language service provider candidate on the list of profiles has been verified by a verification center, wherein verification comprises at least one of: (i) receiving, at the verification center, an audio recording or a video recording of a language service provider candidate speaking in the language type, or (ii) conducting, by the verification center, an audio or video conference with the language service provider candidate, to verify that the language service provider candidate can provide language service at a proficiency level indicated in provider information, wherein the user and the converser are in person and a selected language service provider is remote.

16. The method of claim 15, wherein the request further includes information comprising a specialization of the real-time interpretation service, further comprising identifying, from the first group of language service provider candidates, a fifth group of language service provider candidates, whose database entries indicate that each candidate in the fifth group has a corresponding specialization including a legal specialization or a medical specialization.

17. The method of claim 15, wherein the request further includes information comprising a preference for a time zone of the language service provider candidates, further comprising identifying, from the first group of language service provider candidates, a fifth group of language service provider candidates, whose database entries indicate that each candidate in the fifth group is in a time zone corresponding to the preference.

18. The method of claim 15, wherein the request further includes information comprising a preference for a minimum rating of the language service provider candidates, further comprising identifying, from the first group of language service provider candidates, a fifth group of language service provider candidates, whose database records indicate that each candidate in the fifth group meets a minimum rating requirement.

19. The method of claim 15, further comprising:

identifying, from the first group of language service provider candidates, a fifth group of language service provider candidates who are online.

* * * * *